United States Patent
Sapuram et al.

(10) Patent No.: US 7,200,674 B2
(45) Date of Patent: Apr. 3, 2007

(54) ELECTRONIC COMMERCE COMMUNITY NETWORKS AND INTRA/INTER COMMUNITY SECURE ROUTING IMPLEMENTATION

(75) Inventors: Raghunath Sapuram, Cedar Park, TX (US); Jayaram Rajan Kasi, San Jose, CA (US); Todd Christopher Klaus, San Jose, CA (US); Christopher Crall, Seattle, WA (US); Joseph Sanfilippo, San Jose, CA (US)

(73) Assignee: Open Invention Network, LLC, Pound Ridge, NY (US)

( * ) Notice: Subject to any disclaimer, the term of this patent is extended or adjusted under 35 U.S.C. 154(b) by 802 days.

(21) Appl. No.: 10/199,967

(22) Filed: Jul. 19, 2002

(65) Prior Publication Data

US 2004/0015596 A1 Jan. 22, 2004

(51) Int. Cl.
*G06F 13/00* (2006.01)
(52) U.S. Cl. .................. 709/238; 709/249; 709/250
(58) Field of Classification Search ............... 709/206, 709/230, 236, 238, 249, 250
See application file for complete search history.

(56) References Cited

U.S. PATENT DOCUMENTS

| | | | |
|---|---|---|---|
| 5,005,200 A | 4/1991 | Fischer | |
| 5,157,726 A | 10/1992 | Merkle et al. | |
| 5,159,630 A | 10/1992 | Tseng et al. | |
| 5,224,166 A | 6/1993 | Hartman, Jr. | |
| 5,311,438 A | 5/1994 | Sellers et al. | |
| 5,557,798 A | 9/1996 | Skeen et al. | |
| 5,790,677 A | 8/1998 | Fox et al. | |
| 5,812,669 A | 9/1998 | Jenkins et al. | |
| 5,941,945 A | 8/1999 | Aditham et al. | |
| 5,944,783 A * | 8/1999 | Nieten ................. 709/202 |
| 6,049,785 A | 4/2000 | Gifford | |
| 6,072,942 A | 6/2000 | Stockwell et al. | |
| 6,115,744 A | 9/2000 | Robins et al. | |
| 6,125,391 A | 9/2000 | Meltzer et al. | |
| 6,148,290 A | 11/2000 | Dan et al. | |
| 6,269,380 B1 | 7/2001 | Terry et al. | |
| 6,389,533 B1 | 5/2002 | Davis et al. | |
| 6,393,442 B1 | 5/2002 | Cromarty et al. | |
| 6,425,119 B1 | 7/2002 | Jones et al. | |
| 6,434,628 B1 | 8/2002 | Bowman-Amuah | |
| 6,463,460 B1 | 10/2002 | Simonoff | |

(Continued)

FOREIGN PATENT DOCUMENTS

WO WO 01/33369 A1 5/2001

OTHER PUBLICATIONS

White Paper, "Plug and Play Business Software Integration The Compelling Value of the Open Applications Group" Open Applications Group, Copyright 2000, pp. 1-15.

(Continued)

*Primary Examiner*—Viet D. Vu
(74) *Attorney, Agent, or Firm*—Ernest J. Beffel, Jr.; Haynes Beffel & Wolfeld LLP

(57) ABSTRACT

The present invention includes devices and methods to establish networks of communities, route documents among communities having dissimilar interfaces and do so in a trusted and trustworthy manner. Particular aspects of the present invention are described in the claims, specification and drawings.

5 Claims, 13 Drawing Sheets

U.S. PATENT DOCUMENTS

| | | | |
|---|---|---|---|
| 6,538,673 B1 | | 3/2003 | Maslov |
| 6,578,087 B1 | * | 6/2003 | Garakani et al. ............ 709/242 |
| 6,614,765 B1 | * | 9/2003 | Bruno et al. ................. 370/255 |
| 6,636,889 B1 | | 10/2003 | Estrada et al. |
| 6,925,482 B2 | * | 8/2005 | Gopal et al. ................. 709/201 |
| 7,068,667 B2 | * | 6/2006 | Foster et al. ................. 370/398 |
| 2003/0046583 A1 | | 3/2003 | Goldman et al. |
| 2003/0097464 A1 | * | 5/2003 | Martinez et al. ............ 709/238 |
| 2003/0101279 A1 | * | 5/2003 | Maheshwari ................ 709/241 |
| 2003/0208505 A1 | | 11/2003 | Mullins et al. |

OTHER PUBLICATIONS

Open Applications Group White Paper Document No. 20010301, Best Practices amd XML Content for eBusiness and Application Integration, OAGIS Extensions Release 1.1, 2001,pp. 1-34.

Glushko article: Advanced Technology Program Close Out Performance Report: Project Title: Component-Based Commerce: The Interoperable Future, Apr. 14, 2000, 8 pages, Publication Status Unclear.

Glushko article: ATP Close Out Performance Report: Component-Based Commerce: The Interoperable Future, 9th Revision, modified Jan. 31, 2000, 57 pages, Publication Status Unclear.

Jones, Information Security article, Jan. 2002, Authorization / EAM Ain't Easy, http://www.infosecuritymag.com/2002jan/features_eam.shtml, 12 pages.

Salz, R., O'Reilly, XML.COM: Examining WSDL, May 15, 2002, available at http://www.xml.com/pub/a/2002/05/15/ends.html, 5 pgs.

Schneier, Bruce, Applied Cryptography 1966, John Wiley and Sons, Inc., pp. 40-41.

Vordel Web Services Security: Knowledgebase, http://www.vordel.com/knowledgebase/vordel_view1.html, printed 9/112002, 2 pages.

WebServices Framework & Assertion Exchange Using SAML, 5 pages, http://www.w3.org/2001/03/WSWS-popa/paper23/, printed Sep. 11, 2002.

Cover Pages: Web Services Description Language (WSDL), Technology Reports, 31 pages, Jul. 9, 2002, located at http://xml.coverpages.org/wsdl.html.

Editors; Dan Brickley and R.V. Guha, "Resource Description Framework (RDF) Schema Specification", W3C Proposed Recommendation Mar. 3, 1999, W3C XP-002203858, available at http://www.w3.org/TR/1999/PR-rdf-schema-19990303, 1-29.

Editors: David Beech et al., "XML Schema Part 1: Structures", W3C Working Draft May 6, 1999, W3C XP-002203859, available at http://www.w3.org/1999/05/06-xmlschema-1, 1-53.

Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.

Kent Brown, "BizTalk: Fluent in E-Business", XP-002203861, 1-6, Dec. 1999.

W. Yeong, T. Howes, S. Kille, "Lightweight Directory Access Protocol", ISODE Consortium, Mar. 1995, 1-19.

R. Moats, "URN Syntax", AT&T, May 1997, 1-7.

Nils Klarlund, Anders Moller, Michael I. Schwartzbach, "Document Structure Description 1.0", AT&T and BRICS 1999, XP-002203865, 1-34.

K. Narayanaswamy, K.V. Bapa Rao, "An Incremental Mechanism for Schema Evolution in Engineering Domains", IEEE 1988, 294-300.

Editors: Tim Bray, Jean Paoli, C.M. Sperberg-McQueen, "Extensible Markup Language (XML)", World Wide Web Consortium Dec. 8, 1997, W3C XP-002203864, available at http://www.w3.org/TR/PR-xml-971208, 1-32.

A. Davidson, M. Fuchs, M. Hedlin, M. Jain, J. koistinen, C. Lloyd, M. Malone, K. Schwarzhof, "Schema for Object-Oriented XML 2.0", W3C Note Jul. 30, 1999, W3C XP-002203857, available at http://www.w3/org/1999/07/NOTE-SOX-19990730, 1-22.

* cited by examiner

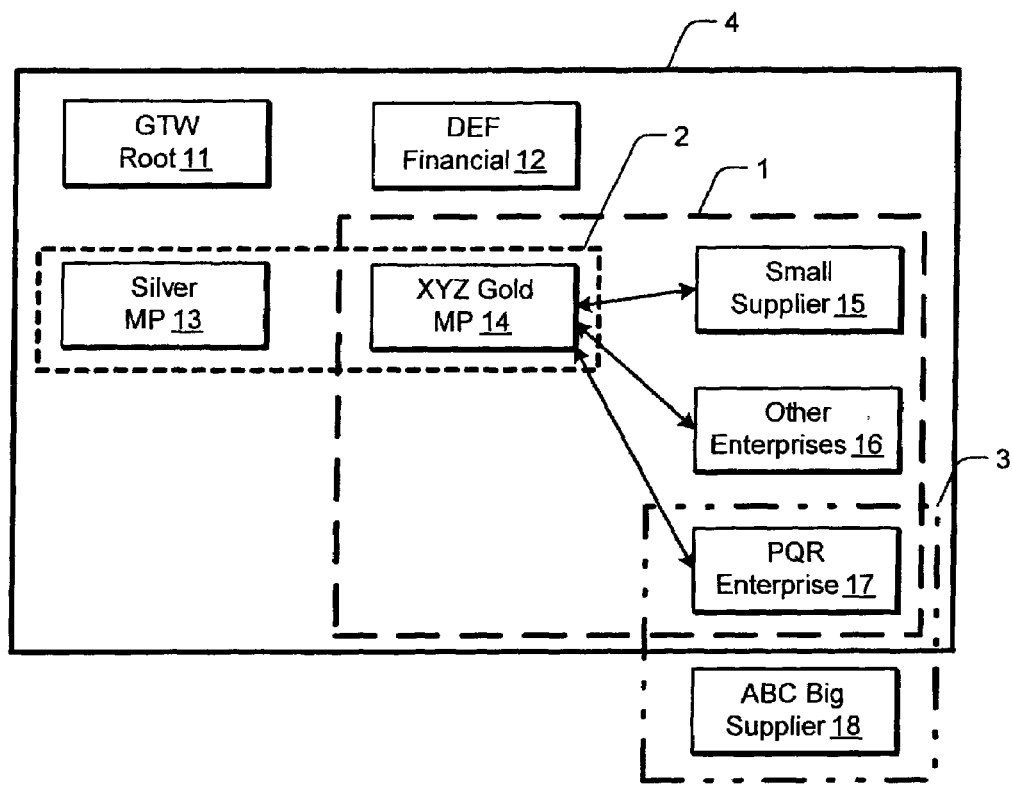
Figure 1
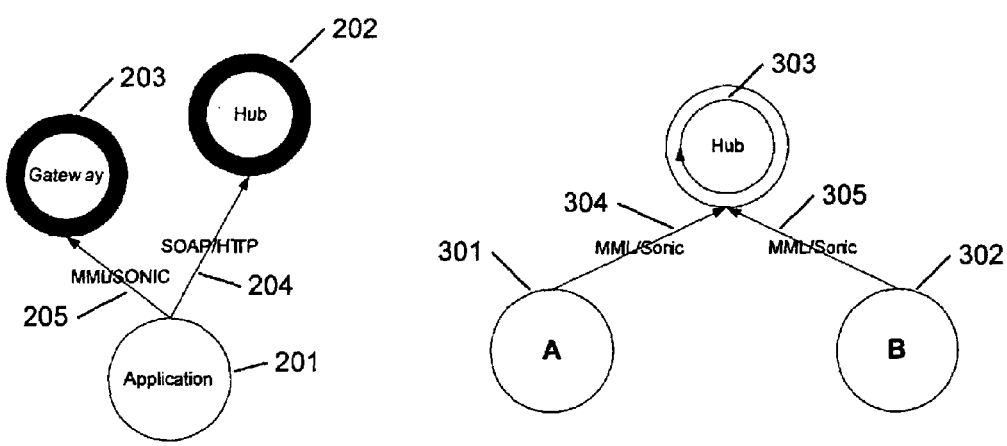
Figure 2
Figure 3

US 7,200,674 B2

ELECTRONIC COMMERCE COMMUNITY NETWORKS AND INTRA/INTER COMMUNITY SECURE ROUTING IMPLEMENTATION

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to systems and protocols supporting communication of electronic commerce documents among participants in a community and among participants in communities that are joined in a network of communities. More particularly, it relates to systems and protocols for routing electronic commerce documents among participants and for securing transmission along routes.

Business-to-business (B2B) and application-to-application (A2A) electronic commerce are replacing former protocols for electronic data interchange (EDI). As businesses strive to improve their efficiency with B2B and A2A systems, a number of incompatible platforms and competing standards have emerged. Among compatible standards, gaps remain to be filled. For instance, the industry has defined what a simple web service is. Standards related to simple Web service include UDDI, WSDL, XSDL and SOAP. However, these standards do not fully mean the security, reliability, manageability, and choreography requirements for practical B2B and A2A electronic commerce. Conversations and collaborative web services composition based on process flow are ingredients of collaborative and complex web services, which are not the subject of any comprehensive or unified standard.

There are a number of industry initiatives to extend standards applicable to B2B and A2A electronic commerce. Choreography efforts include ebXML/BPSS from OASIS, WSFL from IBM, and XLANG from Microsoft. Conversation efforts include ebXML/TRP from OASIS and Microsoft's WS-routing. The dominant security effort is WS-security from IBM and Microsoft, there is also a complementary security effort in OASIS called SAML. For reliability, there are proposals from Microsoft, ebXML/TRP from OASIS, and HTTPR from IBM. W3C is addressing standardization in all of these areas. Key industry players have formed a rival consortium called WSI. There are no real standards for process flow, although there are many proprietary implementations of process flow. For manageability, it may be useful to define centrally information that empowers interoperability of web services, by specifying policies and capabilities of entities involved in electronic commerce. One industry standard for central definitions is ebXML CPP/CPA contract definitions, which is promulgated by OASIS.

Accordingly, an opportunity arises to devise methods and structures that embrace, unify and fill the gaps among many relevant Web service standards, including SOAP, UDDI, ebXML, WSDL, WS-security, SAML, and XSDL. Overall, end to end services and capability for secure delivery of electronic commerce documents between entities desiring to do business is useful.

SUMMARY OF THE INVENTION

The present invention includes devices and methods to establish networks of communities, route documents among communities having dissimilar interfaces and do so in a trusted and trustworthy manner. Particular aspects of the present invention are described in the claims, specification and drawings.

BRIEF DESCRIPTION OF THE DRAWINGS

FIG. 1 depicts several entities belonging to several communities.

FIG. 2 depicts an entity or connector having alternate communication channels.

FIG. 3 depicts a connector serving as hub between two connectors using similar communication channels.

Additional security use cases appear in FIGS. 20 through 25.

DETAILED DESCRIPTION

Figure 4:
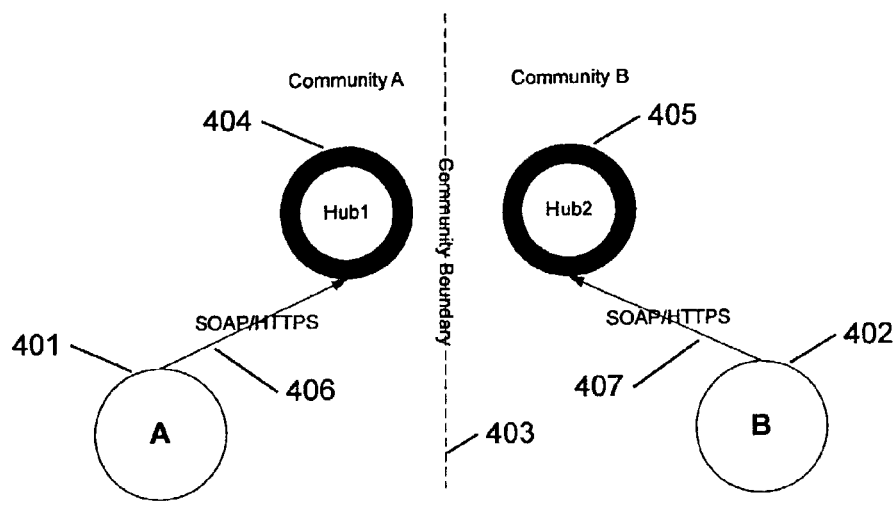
FIGS. 4 and 5 depict communication across a community boundary, between communities in a community network.

The following detailed description is made with reference to the figures. Preferred embodiments are described to illustrate the present invention, not to limit its scope, which is defined by the claims. Those of ordinary skill in the art will recognize a variety of equivalent variations on the description that follows.

FIG. 1 illustrates communities and networks of communities. Among these communities, a community maintains a local registry that includes information such as users, companies, services and connectors that are part of the community. The community can be a marketplace, an enterprise or a sub enterprise. Communities can belong to one or more community networks. Typically, communities and networks have some common business interest. Interoperation is between member communities in one or more community networks. The networks include a gold marketplace network 1, a precious metal marketplace network 2, a private network 3 and a global trading web network 4. In this illustration, the gold marketplace network 1 and the precious metal marketplace network 2 are contained within the global trading web network 4. The precious metals marketplace network 2 includes gold and silver marketplaces 14, 13. Gold marketplace customers can trade silver in the silver marketplace 13 and silver marketplace customers can trade in gold 14. One community, PQR Enterprise 17 belongs to the gold marketplace network 1, the private network 3 and the global trading web network 4; another community, ABC Big Supplier 18 belongs to the private network 3. In this illustration, XYZ Gold 14 is a marketplace or community for trading gold. Enterprises belong to this community. Enterprises like PQR Enterprise 17 that have formed a community by themselves belong to the gold marketplace network 1. These communities are part of the gold marketplace network 1, and the global trading web network 4. Small supplier 15 is part of the gold marketplace community. Other enterprises 16 are communities that are part of the gold marketplace community network 1. The connections between XYZ Gold 14 and other gold marketplace entities 15–17 indicate that the gold marketplace requires all traffic between enterprises (communities or otherwise) transacting gold trading to be routed through XYZ Gold14, for instance, to collect billing and business intelligence information. PQR Enterprise 17 is a community is part of the gold marketplace and also part of local private network with supplier 18. Small supplier 15 may be an individual small supplier that does not want to form a community by itself and instead registers its metadata, such as users, organizations, services and transformations, in the registry of the gold marketplace. On the other hand, ABC Big Supplier 18 has formed a private network of its own, for instance because it wants to keep its metadata, internal back office systems and transformations hidden from general public access because they were developed at considerable cost. Because PRQ 17 is a customer of ABC 18, it participates in the private network 3. Financial service provider DEF Financial 12 wants to provide financial services to anyone in the global trading web network 4, such forms a community of its own and registers with the global trading web root 11. A network of communities makes available a global registry of communities. The global registry permits lookup of the community and determination of one or more routes to that community, or to external connectors through which the electronic commerce documents bound for the community may be routed. Documents routed from one community to another may be routed directly between external connectors for the two communities or indirectly through one or more intermediary communities. Business and security rules for transactions involving the communities also can be defined and maintained in community registries. In general, FIG. 1 illustrates the mixed loyalties of entities and communities that create an impetus for interoperability among electronic commerce platforms.

Connector is a general term for applications that communicate with other applications. Connectors may communicate on a peer-to-peer (P2P) basis or on a directed basis through other connectors that function as hubs, gateways, external ports, central connectors, etc. Connectors that communicate P2P are able to communicate with other connectors that use the same transport/envelope protocols. Connectors that communicate P2P optionally may enlist the assistance of other hub connectors that perform translation services, when trying to communicate with a connector that does not use the same transport/envelope protocol. Connectors that communicate on a directed basis communicate through hub connectors according to routing rules. Routing rules among connectors can be mapped in a directed graph, supporting one or more hub and spoke topologies for one or more transport/envelope protocols. A hub and spoke topology directs communications along spokes to hubs, in one or more tiers. This facilitates centralized services such as billing, business intelligence collection, tracking, auditing, accounting, or others. Multiple hub and spoke organizations may overlay the same connectors to support different transport/envelope protocols and technologies, as suggested by FIG. 2. For instance, a stronger hub and spoke organization may be required to use Sonic as a transport technology than to use HTTP or HTTPS. Optionally, communication routes may depend on whether the source and destination are part of the same community. Within a sub-community (which may include the whole community), centralized functions may be unneeded and P2P communications permitted among connectors that otherwise are directed to communicate with parent connectors when communicating with destinations in other sub-communities.

Connectors may be labeled simple connectors (sometimes simply called connectors), hubs (sometimes called gateways or routers) or central connectors. Alternatively, they may be described functionally. Simple connectors are directed to communicate via hub connectors, except when they are permitted to communicate P2P among connectors in the same sub-community. So-called hubs are used by connectors that are explicitly directed or linked to them. Hubs may serve more than one function and, accordingly, may appear more than once in a route from a source to a destination. Hubs forward electronic commerce documents or messages. Hubs also may translate among transport protocols that support a common envelope protocol. For instance, a hub may translate envelope protocols and also implement a different transport protocol upon transmission than upon receipt. A central connector is a special case of a hub, which can be used by connectors that are not explicitly directed or linked to them. A central connector is useful, for instance, to carry out translation functions when traversing connectors from a source according to routing rules does not lead to any hub that supports the transport/envelope protocol used by the destination.

FIG. 2 illustrates three connectors: a simple connector 201, and a pair of hubs 202–203, one of which has been called a gateway 203. The connector 201 is constrained by routing rules to direct communications to hub 202 when the transport/envelope protocols are SOAP/HTTP 204 and to hub 203 when using MML/Sonic 205. In effect, the child 201 has two parents 202–203. The relevant parent depends on the communication protocols 204–205 being used. The illustrated overlays of directed routes for communication protocols might be further overlaid by transport security protocols, so that routes through parents depend on a triplet of transport/envelope/transport security protocols. Alternatively, as used herein, transport/envelope protocol may refer to a single unified protocol that supports both encapsulation and transport. At present, transport and envelope protocols are distinct, but use of the term transport/envelope protocol is intended to encompass any future unified protocol.

Figure 5:
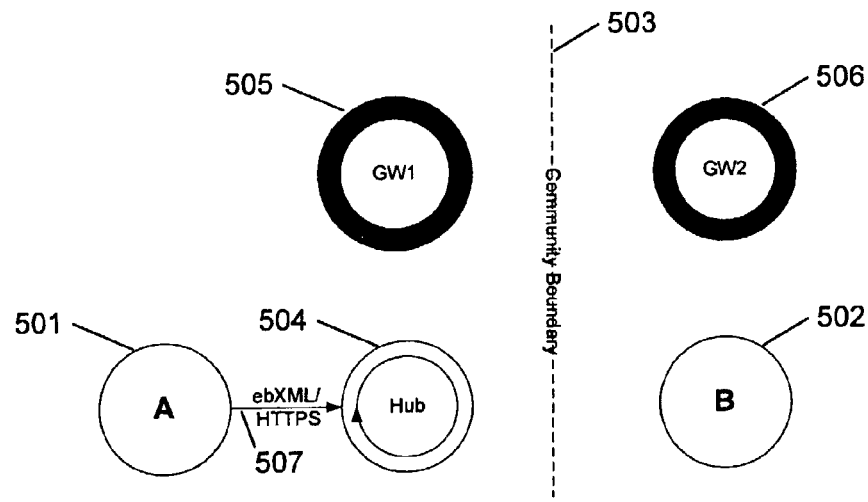

FIGS. 3–7 illustrate different relationships of a source A and destination B. In FIG. 3, source 301 and destination 302 are in the same community. They both are directed to hub 303 by routing rules that direct communications via MML/Sonic 304, 305 to hub 303. In FIG. 4, source 401 and destination 402 are in different communities, separated by a community boundary 403. The source and destination are directed to communicate via hubs 404 and 405, respectively, when using SOAP/HTTPS protocols 406, 407. The hubs in this example are also external connectors that are registered as accessible to other communities, because communications between communities are via external connectors. In FIG. 5, source 501 and destination 502 are again separated by a community boundary 503. The source 501 is directed to communicate with hub 504 via ebXML/HTTPS protocols 507. Hubs 505, 506 may be considered central connectors, to which hub 504 and connector 502 are not explicitly directed or linked. Suppose that destination 502 uses MML/HTTPS protocols. Hub 504 does not have translation capabilities, but hubs 505, 506 do. The common protocols of the hubs are SOAP/some transport. The respective hubs translate ebXML/HTTPS to SOAP/some transport 505 and MML/HTTPS to the same 506. If the hubs perform two translation functions, then they may appear twice in this route from source to destination. As illustrated, the hubs 505, 506 are also external connectors, because they communicate across a community boundary 503. If the community boundary 503 were not present, the hubs would not be external connectors.

Figure 6:
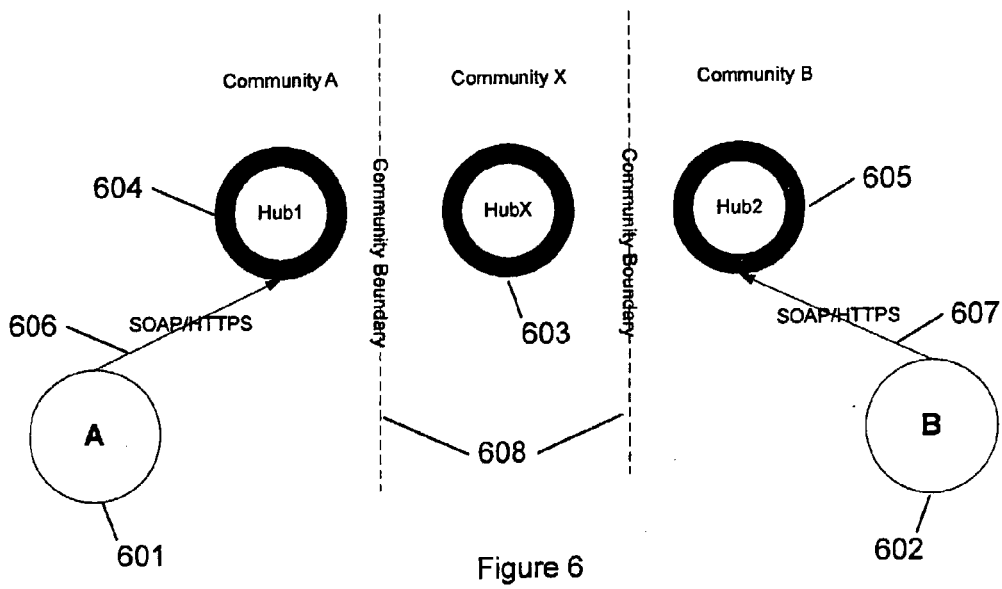
FIG. 6 depicts an intermediary community, a chain of communications.
Figure 7:
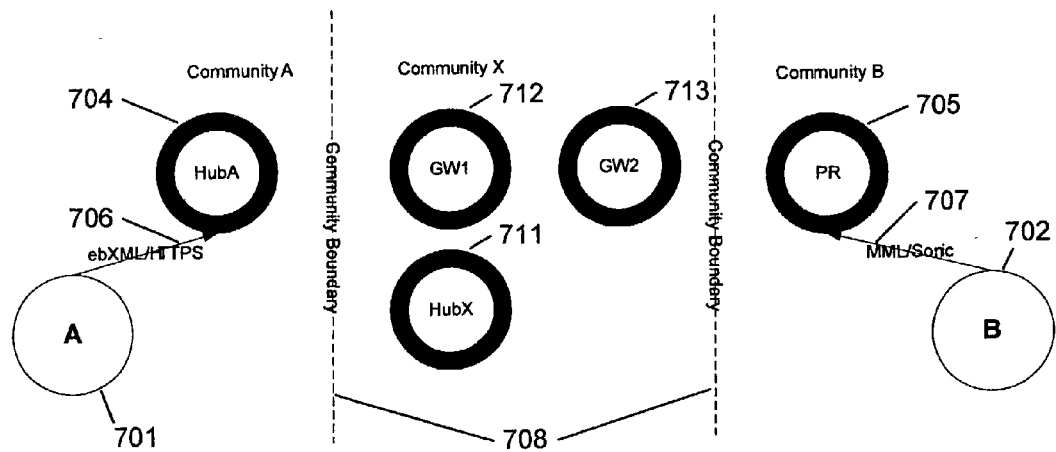
FIG. 7 depicts use of an intermediary communities for translation services.

In FIGS. 6–7, intermediary communities are introduced to provide services. These services are gateways and business intelligence data collection. Intermediate communities are typically marketplaces that provide connectivity to enterprises through gateways using a variety of protocols. They could also act as a trusted intermediary for enterprises to interact with each other. They could also provide business intelligence data to their customers. In FIG. 6, the service is bridging two communities in the network. It is possible for an implementation to support intermediaries that belong to multiple networks and acts as a bridge between networks for members of both networks that permit this. For instance, in FIG. 6, source and destination communities 601 and 602 may not belong to the same community network. Supposing that community 603 belongs to one community network in common with source 601 and another community network in common with destination 602, then community 603 can serve as a trusted intermediary in communications between source and destination. The community boundaries 608 in this case in the illustration are also community network boundaries. This is a simple case, because the protocols 606, 607 used by the source 601 and destination 602 are the same. No translation is required by any of the hubs 603–605. In FIG. 7, translations are required because connector 701 uses the ebXML/HTTPS 706 protocol, whereas connector 702 uses the MML/sonic protocol 707. In this figure, hubs 711, 712 and 713 belong to an intermediary community separated by community boundaries 708 from the source community and destination community. All three hubs are involved in transport from the source to destination. Hub 711 is an external connector that receives an electronic commerce document from hub 704. The first translation is performed by hub 712, from ebXML/HTTPS to soap/HTTPS. This is still not the combination of protocols required at the destination, so the document is forwarded to hub 713. Hub 713 performs a further translation from soap/HTTPS to MML/sonic, which is the protocols combination at the destination. The document is forwarded to hub 705.

Figure 8:
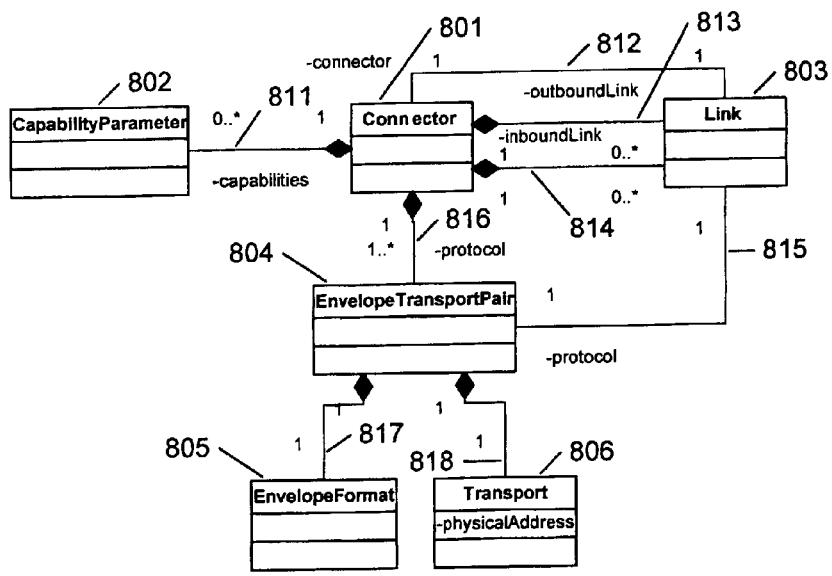
FIG. 8 is a block diagram of electronic registry data supporting routing within a community.

The routing required to convey messages as depicted in FIGS. 3–7 is supported by a registry including routing information and a routing algorithm. FIG. 8 is a simplified diagram of parts of a registry that include routing information. A connector 801 is the central feature of this data structure. A connector has capabilities 802 such as envelope translation, transport translation, external visibility, peer-to-peer routing, membership in a sub community, and peer-to-peer routing to other connectors in the same sub community. Accordingly, the relationship 811 between connector 801 and capabilities 802 supports zero or more capabilities. One or more links 803 connect the connector 801 to protocols 804 and other connectors. The relationship 816 between a connector 801 and a particular transport/envelope protocol 804 supports one or more protocols. From a connector 801 through 812 a link 803 to 815 protocols 804, the relationships are one-to-one. That is, there is no more than one outgoing link 813 from a connector 801 to a particular transport/envelope protocol 804, except in the case mentioned above and not illustrated in FIG. 8, where transport protocols are further differentiated by security considerations. The outbound link 813 and inbound link 814 correspond to routing rules. And the outbound link 813 expresses the routing rule that messages to be communicated according to a particular transport/envelope protocol 815, 804 need to be forwarded to another connector. The link 803 is associated with both the child and parent connectors 801. An inbound link 814 identifies the connector 801 as the destination for communications by a child connector according to a particular transport/envelope protocol, which is expressed by a routing rule applied to the child connector. For a transport/envelope protocol 804, there is both transport information 806 and envelope format information 805. This transport and envelope information 806, 805 may be linked 818, 817 to the protocol pair 804 instead of being part of the same object, as a matter of normalizing the object structure. A further so-called channel object may be introduced between the connector 801 and the protocols 804 to further normalize the data structure, in the case mentioned above, when routing depends on a triplet of transport/envelope/security.

Figure 9:
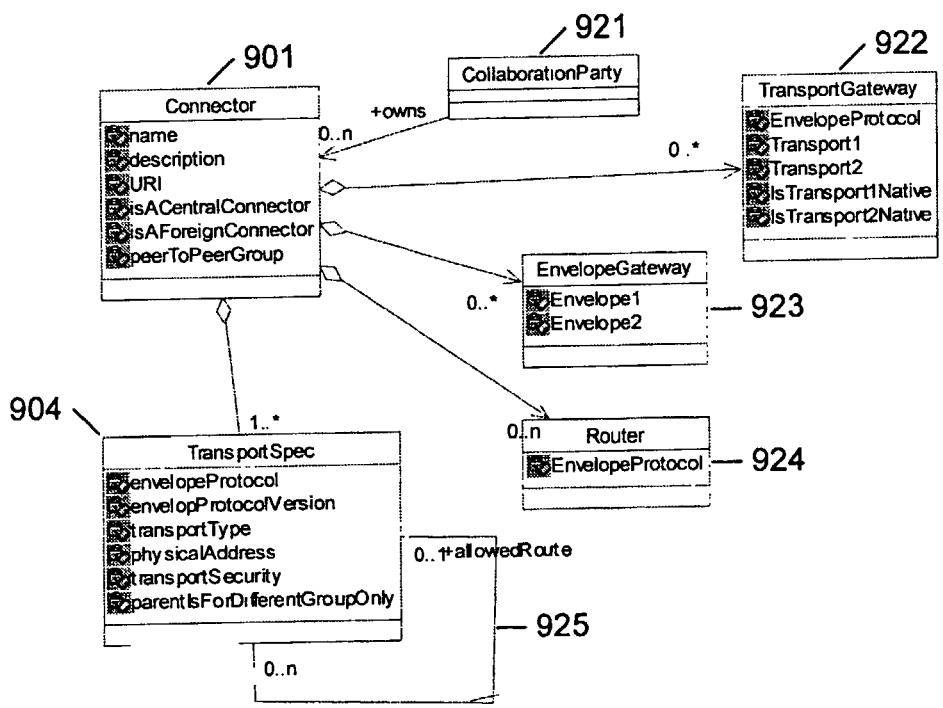
FIG. 9 is a more detail electronic registry diagram.

FIG. 9 provides an alternative view of parts of a registry that describe a connector. A connector 901 has various attributes. It has a name, which may be a concatenation of a community name and an individual connector name. It has a description and a universal resource indicator (URI). Flags indicate whether the connector is a central connector or a foreign connector. A foreign connector is a user defined connector. Within a community, membership in a sub community is reflected in the attribute peerToPeerGroup. This attribute may be a string that contains the name of a management domain or sub community. Capabilities of the connector 901 include transport translation 922, envelope translation 923 and router action 924. A connector 901 may have more than one transport translation capability 922. In present implementations, transport is associated with the particular envelope protocol. Translation is assumed to be bidirectional from transport1 to transport2. Flags indicate whether the two transport protocols are native to the software implementation. One software implementation provides native transport support for HTTP, HTTPS and sonic transport protocols. Other transport protocols, such as FTP, may be user implemented. A connector 901 also may have more than one envelope translation capability 923. Translation is again assumed to be bidirectional. A connector also may have router capabilities 924. A router capability refers to the ability of a hub connector to forward messages received from other connectors. In present implementations, routing is associated with a particular envelope protocol. A connector 901 is also associated with transport/envelope protocols 904. A transport specification is supported for a particular envelope protocol and protocol version. Various transport types may be used with a particular envelope protocol. A physical address is associated with a particular transport type. Optionally, transport security may be associated with a particular transport type. A transport specification 904 may either reflect a transport/envelope pair or a transport/envelope/security triplet. A flag indicates whether routing rules may be ignored and communications directed on a peer-to-peer basis between the connector and other connectors that are members of the same sub community, according to the transport specification. Routing rules correspond to allowed routes 925. The registry organization illustrated in FIG. 9 can be further normalized by introducing a channel object between the connector 901 and the transport spec 904, to group transport specs by envelope protocol or by transport/envelope protocols.

Figure 10:
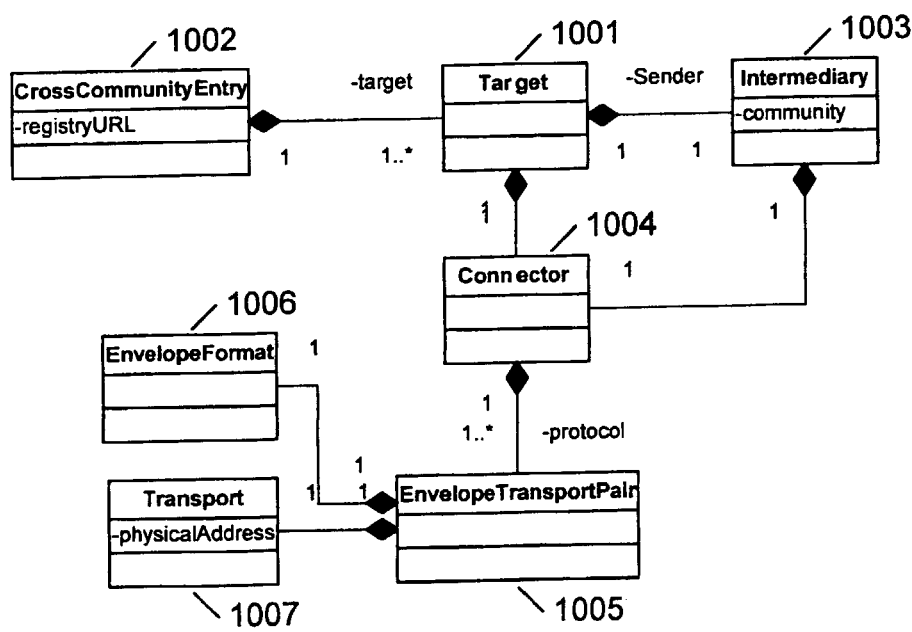
FIG. 10 is a block diagram of electronic registry data supporting routing between communities.

FIG. 10 provides a high-level view of parts of a registry that support routing between communities. A target 1001 is the destination the source is trying to reach. The target may either be an ultimate destination or a point near the destination that is responsible for forwarding to the destination. A target is associated with a community, which provides an address, such as a URL, at which a community registry can be accessed. A present implementation supports designation of one intermediary community 1003 through which messages are forwarded to the target 1001. A target is associated with a destination connector 1004 and one or more transport/envelope protocols 1005. As in FIG. 8, a transport/envelope protocol is associated with an envelope format 1006 and a transport 1007.

Here is a sample XML file using this schema with two applications in a simple hub and spoke topology.

```
<?xml version="1.0" encoding="UTF-8"?>
<Registry xmlns:xsi="http://www.w3.org/2001/XMLSchema-instance"
xsi:noNamespaceSchemaLocation="D:\design\routing\registry.xsd">
    <Connector uuid="A">
        <TransportSpec uuid="A01">
            <Parent>Hub01</Parent>
            <EnvelopeProtocol version="C1">SOAP</EnvelopeProtocol>
            <TransportType>Sonic</TransportType>
            <PhysicalAddress>String</PhysicalAddress>
        </TransportSpec>
    </Connector>
    <Connector uuid="Hub">
        <TransportSpec uuid="Hub01">
            <Parent>None</Parent>
            <Child>A01</Child>
            <Child>B01</Child>
            <EnvelopeProtocol version="C1">SOAP</EnvelopeProtocol>
            <TransportType>Sonic</TransportType>
            <PhysicalAddress>String</PhysicalAddress>
        </TransportSpec>
        <Capability>
            <Hub>
                <EnvelopeProtocol version="C1">SOAP</EnvelopeProtocol>
            </Hub>
        </Capability>
    </Connector>
    <Connector uuid="B">
        <TransportSpec uuid="B01">
            <Parent>Hub01</Parent>
            <EnvelopeProtocol version="C1">SOAP</EnvelopeProtocol>
            <TransportType>Sonic</TransportType>
            <PhysicalAddress>String</PhysicalAddress>
        </TransportSpec>
    </Connector>
</Registry>
```

This registry data corresponds to a variation on FIG. 3, in which the source and destination connectors 301, 302 utilize SOAP/Sonic protocols 304, 305. The hub 303 is named "Hub 01", in this sample entry. The data generally conforms to the organization of FIG. 9.

Figure 11:
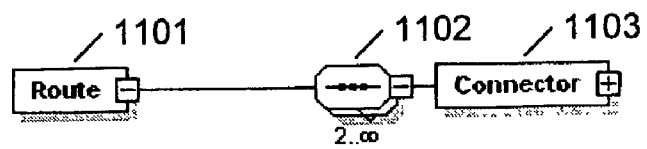
FIGS. 11 and 12 illustrate an XML format in which a route may be compiled.
Figure 12:
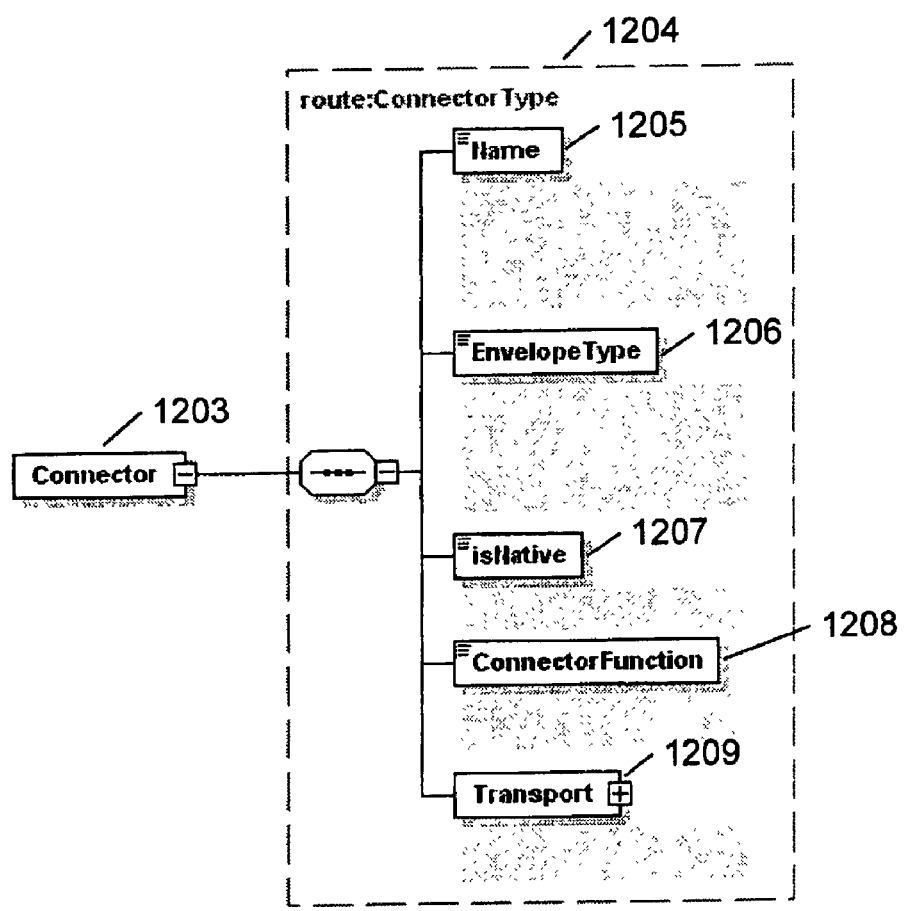

A single format of a routing block can be used both for routing within a community and between communities. FIGS. 11 and 12 illustrate a format which a route can be expressed using XML; a sample follows. In FIGS. 11 and 12 a route 111 is associated 1102 with two or more connectors 1103/1203. A connector 1203 is associated with a complex data type 1204 which includes the name 1205, envelope type 1206, flag for native or foreign transport 1207, connector function designation 1208 and transport protocol 1209. The transport protocol 1209 is further associated with the transport address, not depicted in the figure. A route 1101 defines a list of connectors to be traversed from a source to destination. The connector 1103/1203 provides a single function along the route. The name 1205 may be a unique name, such as a concatenation of issuing authority prefix/connector type/community name/local name. Envelope type 1206 is the envelope type upon arrival at this connector, for instance, SOAP, ebXML or MML. The "Is Native" flag 1207 indicates whether the transport type is native to the software system or is supported as a user implemented extension. The connector function 1208 identifies the function to be performed at this node. The transport 1209 identifies the transport used to reach this node. The transport/envelope protocols for this node correspond to a combination of the transport 1209 and envelope type 1206. An XML code sample generally conforming to this data organization follows:

```
<?xml version="1.0" encoding"UTF-8"?>
<Route xmlns="http://commerceone.com/wse/routing"
xmlns:xsi="http://www.w3.org/2001/XMLSchema-instance"
xsi:schemaLocation="http://commerceone.com/wse/routing
D:\design\routing\route-block.xsd">
    <Connector>
        <Name>
            BUY:C:buySpice:nutmeg
        </Name>
        <EnvelopeType>ebXML</EnvelopeType>
        <isNative>true</isNative>
        <ConnectorFunction>service-send</ConnectorFunction>
        <Transport type="HTTPS" mode="sync" reliable="false">
            <Address>http://buyer.com/buy/nutmeg</Address>
        </Transport>
    </Connector>
    <Connector>
        <Name>
            BUY:C:buySpice:gw1
        </Name>
        <EnvelopeType>ebXML</EnvelopeType>
        <isNative>true</isNative>
        <ConnectorFunction>envelope-gateway</ConnectorFunction>
        <Transport type="HTTPS" mode="sync" reliable="false">
            <Address>http://gateway.seller.com/external</Address>
        </Transport>
    </Connector>
    <Connector>
        <Name>
```

-continued

```
        BUY:C:buySpice:exotic
    </Name>
    <EnvelopeType>SOAP-C1</EnvelopeType>
    <isNative>true</isNative>
    <ConnectorFunction>service-receive</ConnectorFunction>
    <Transport type="Sonic" mode="async" reliable="true">
        <Address>SonicCluster1:SellApp</Address>
    </Transport>
  </Connector>
</Route>
```

This illustrates a route corresponding to a variation on FIG. 3, in which the source 301 uses ebXML/HTTPS protocols 304 to communicate with the hub 303. The source connector 301 is a native connector named nutmeg. The hub connector 303 also is a native connector, named GW1, which performs an envelope Gateway function. The destination 302 uses SOAP/Sonic protocols 305 to communicate with the hub 303. The destination 302 is a native connector named exotic. All three connectors belong to the community BUY:C:buySpice. The transport protocols used by the source and destination are native to the software implementation, so the hub 303 performs an envelope and transport protocol translation as a single function. Therefore, it appears just once in the sample route code.

Figure 13:
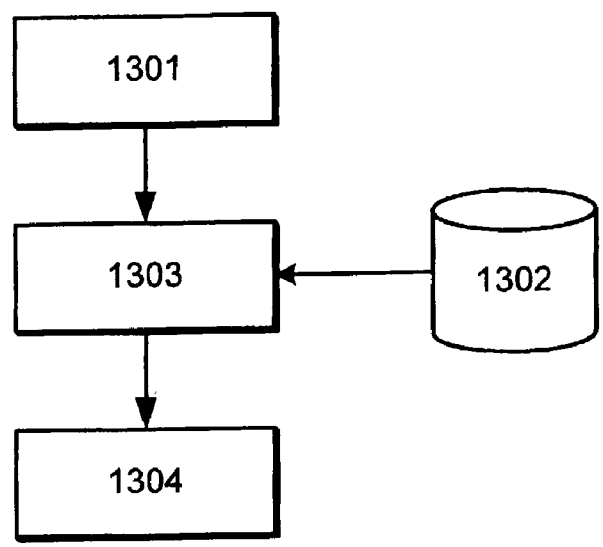
FIGS. 13 and 14 are high-level diagrams of routing within a community and between communities.
Figure 14:
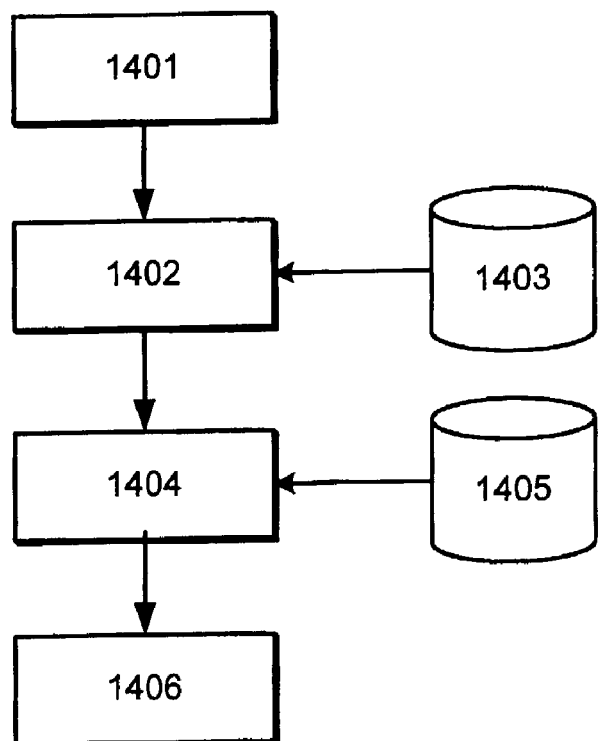

FIGS. 13 and 14 are high-level diagrams of routing within a community and between communities. Routes include a source, destination, and series of connectors in between. For secure routing, routes also included one or more security zones so that communications always remain secure. In FIG. 13, the source and destination, which may be services, are mapped to connectors 1301. A local registry 1302 contains information about connectors from which partial path lists can be constructed 1303 beginning at the source and destination connectors. Constructing a partial path list of connectors through which an electronic commerce document passes includes several substeps. The information in the registry includes routing rules for communication among connectors, which can be represented as a directed graph. Building a partial path list includes traversing from child to parent connector. At each connector in the traverse, alternative transport/envelope protocols available for the next top are treated as separate partial paths. The completion of traversing a partial path from a source or destination corresponds to reaching a connector that has no parent connector available using the particular transport/envelope protocol of the traversal. Alternatively, the completion of traversing a partial path may correspond to reaching a connector that communicates peer-to-peer using the particular transport/envelope protocol of the traversal. Determining whether a connector communicates peer-to-peer may need to take into account the sub community that the connector belongs to, if a flag is set to allow the connector to ignore routing to other connectors in the same sub community. By traversing from child to parent connector, partial path lists are built for the source and destination connectors, including one or more partial paths in each list. The source and destination partial path lists are linked 1304. The respective source and destination partial path lists can be linked through a shared connector, when both partial path lists share a connector and the transport/envelope protocol for the shared connector is the same in both lists or the shared connector has a translation capability to translate between the respective transport/envelope protocols on the respective lists. The respective lists also can be linked between similar connectors in the respective lists, similar connectors being connectors that support the same transport/envelope protocol. As described above, an extension to this routing method is to use transport/envelope/security triplets as the basis for constructing partial path lists. Another alternative for linking respective lists is to link through one or more central connectors that have an ability to translate between transport/envelope protocols appearing in the respective partial path lists. To use central connectors, the partial path lists may be extended from parent connectors to central connectors that are not explicitly linked to the parent connectors.

FIG. 14 applies routing across communities. A route across communities includes hops between communities and the internal, connector-to-connector hops within the communities. The source and destination, which may be services, are mapped to connectors 1401. The respective source and destination connectors belong to communities. The source and destination communities in turn belong to community networks. One or more community networks are identified 1402 from registries 1403 as linking the source and destination communities. If the source and destination community share membership in a community network, external connectors of the respective communities may be directly linked using a common transport/envelope protocol. If the source and destination communities lack a common transport/envelope protocol, one or more intermediary communities may be added to the route to perform translation services. The external connectors of the source and destination are linked to similar connectors of the one or more intermediary communities. In some implementations, the number of intermediary communities may be limited to 1, 2, 3 or some other small number less than 5 or 10, to simplify routing. When a route between external connectors of the source and destination communities, potentially through intermediary communities, has been determined, intra-community routes within each of the participating communities are computed. In the source and destination communities, routes from the source and destination connectors to respective external connectors are calculated 1404, making use of data in one or more registries 1405. For the intermediary communities, routes from incoming to outgoing external connectors are calculated. A complete route is specified by combining intra community and inter community routes 1406, to produce a connector-to-connector route from source to destination. Routing across communities may take advantage of precomputed routes stored in a local or global registry. Precomputed routes may designate an intermediary community through which messages are routed. The intermediary community may provide translation, accounting, business intelligence, or other services. It may be efficient when Routes are computed for sending a message from a source to a destination, to save the routes for later use. Alternatively, idle CPU cycles may be efficiently utilized to precompute routes to other communities in a community network or routes to communities beyond any immediate community network that may be reached through communities in the immediate community network.

The routing of electronic commerce documents preferably follows a secure and trusted route, due to the many threats that may be encountered. A document on the wire is at risk, if not encrypted. The source or destination may be compromised and expose information that is supposed be maintained as confidential. Connectors between the source and destination may act maliciously: they may drop, delay or retransmit documents, record documents that they have received and expose confidential information, or modify documents. Connectors with translation responsibilities may act maliciously or simply change the semantics of the document during translation. These well-known issues create an opportunity to provide methods and devices for secure and trusted communication of electronic commerce documents.

FIGS. 15 through 19 depict some use cases for secure and trusted communication. Trust between the source and destination is established by prior agreement. For instance, companies which are trading partners agree and may register their agreement in the form of collaboration agreement. This collaboration agreement may include document types to use and mutually agreeable security majors, such as signatures and encryption. Security agreements may be reached between trading partners or may be adopted from the communities to which the respective trading partners belong. The manner in which the agreement is reached is unimportant to secure in trusted communications.

Connectors along the route from source to destination are trusted when they are listed in a registry as trusted. A hub is trusted to send the document along the next hop in the route, according to routing and to protect any knowledge it has of the contents or even the transmission of the document along the route. A hub need not be concerned whether a document is encrypted or signed, when it's function is only to forward the document. To support encrypted communications, such as virtual private network communications or HTTPS communications, Hubs may have keys and certificates as implementing a PKI or other security model.

Connectors that provide envelope translation services, so-called gateways, present more complicated trust issues. Translation of a document from one format to another requires that the hub or connector be able to decrypt what it receives and validate signatures. After translation, the gateway re-signs and encrypts what it has translated. To accomplish all of this, the message received by the gateway should been encrypted using the gateway's key, not a key for the destination. The gateway must be able to verify the signature on the message received, preferably by reference to a registry that supports verification signature. Once the gateway has translated a document, it re-signs the document, if the message it received was signed. It also encrypts the message using the key corresponding to the next gateway along the route or to the destination, if no further translation is required. The gateway may have multiple key pairs or certificates, different keys pairs can be used for encryption, signing and for secure, virtual private network connections.

Authentication from the source to destination through gateways is sequential. The first gateway verifies the signature of the source and re-signs the document. The gateway must trust the source, as subsequent gateways must trust the gateway from which they receive a message. Each gateway in the chain trusts the gateway before it, authenticates the signature it receives and applies its own signature. In establishing this chain of security, SAML assertions, for instance, can be accepted and applied by gateways. It is desirable for gateways to keep extensive archives of translated documents, in order to resolve any disputes that arise. Documents should be archived twice, once after decryption as an original document, preferably including the signature received, if any, and once after translation, before encryption, preferably showing the gateway's signature.

Overall, trust in a route may be established when the source and destination trust each other, the source and destination trust the gateways that perform translation, and each connector in the route trusts the prior and subsequent connectors in the route. The trust between source and destination is discussed above. It makes sense in electronic commerce for parties that trust one another before they exchange electronic documents. The source and destination should trust the gateways, because gateways perform translation functions. Lists of trusted gateways may be maintained in a registry. If either the source or destination lacks trust in a gateway connector that performs translation services, that gateway should not be used. While not all trading partners may be particularly sensitive to this, security conscious trading partners, such as defense industry participants, find it advantageous to know each and every connector that might be able to read the contents of a document. Trust requirements may be relaxed for those connectors that only forward documents, without decrypting or translating them.

For example, consider a particular source and destination: The source uses MML envelopes and the destination uses ebXML. One possible route would be from the source to a first gateway, using MML; transformation of the envelope from MML to SOAP; forwarding from the first gateway to a second gateway; translation from SOAP to ebXML; and forwarding from the second gateway to the destination. In this case, the source must trust both the gateways and the destination. The destination must trust the source and the gateways. If either the source or destination does not trust the intermediary gateways that perform translation, the route is unacceptable.

Gateways also should trust the immediately prior source for gateway and the immediately succeeding gateway or destination. This may be referred to as transitive trust. Each element in the trust chain that performs translation wants to be sure that is interacting with elements that it can trust. Following the example above, suppose a route traverses from source to gateway 1, on to gateway 2, and to gateway 3, then to the destination. Along with route, the first gateway must trust the source and the second gateway. The second gateway must trust the first and third gateways. The third gateway must trust the second gateway and destination. In effect, gateway 3 trusts gateway 1 because it trusts gateway 2 which, in turn, trusts gateway 1. Transitive trust is considered sufficient along this sort of route when it is combined with explicit trust between the source and destination. An alternative, simplified trust model may be applied when intermediary communities provide translation gateways. Then, it may be sufficient to trust the intermediary community providing translation services, without requiring trust of each and every gateway used by the intermediary community to perform translation services. This simplification of trust is considered applicable only if an intermediary community is involved. For instance, the source and destination are in the same community the source and destination will trust each other, but may not trust a gateway to perform document translation. Within a community, gateways should be explicitly trusted. Within a network of communities, intermediary communities may be trusted to perform certain translation services, without the necessity of trusting each and every component of the intermediate community's translation mechanism.

Many different models for authentication and trust may be used. Three presently used security models for authentication include: username and password; SAML authentication assertions; and X.509 certificates. Operation of these and other security models can collectively be referred to as making security credentials. The security credentials may be provided by a server that runs as a separate process or a routine or section of code. For username and password authentication, the receiving side verifies the username and password. Communication of the username and password should be via an encrypted channel.

The SAML assertion is more complicated. Part of trust between the source and destination is that the destination trusts the authority that generates the SAML assertion. This trust may be on a community wide level or for a particular authority used by a particular source. In general, certificates of trusted SAML authentication authorities and other trusted authorities are maintained in a registry for access by the party needing to verify the assertion.

In operation, a SAML service may be accessible from a SAML client. The SAML service receives a request from the SAML client and responds back to the client. A SOAP envelope, for instance, may be used for this communication. The SAML service may support both authentication and attribute request. In response to an authentication request, it may generate the security credential. Responding to the attribute request, it may generate an attribute assertion. Assertions generated by the SAML service will typically be signed using the SAML service's signing key. For basic authentication, the SAML service may extract a trading partner or userid and password from an application credential header block of the SOAP envelope. This service calls a registry access application program interface to obtain the password corresponding to a trading partner or userid. It compares the received and registry passwords. If they match, it generates an assertion and signs it. If they do not match, it reports an error. In alternative embodiment, passwords may be hashed before being stored in the registry. If so, the hashes will be compared.

For X.509 authentication, trust should be based on the certificate authority that issued the certificate. Listing of trusted certificate authorities may be based on the identity of the certificate authority or a combination the certificate authority identity and the correspondent identity. The list of trusted certificate authorities, such as VeriSign class three certificates, may include certificates that will be trusted regardless of which community they come from. Alternatively, a list of trusted certificate authorities may be specific to remote communities. Thus, Boeing certificates might only be trusted when they come from a Boeing community. VeriSign certificates may be trusted for multiple communities.

A SAML service may respond to an X.509 authentication certificate. Upon receiving an X.509 certificate, it may extract the certificate from an application credential header block of a SOAP envelope. It may retrieve process info stored in an attachment. If the attachment is empty, it will report an authentication failure. It will compare the client certificate extracted from the process info field of the attachment with one from the credential header block. If the certificates do not match, it reports an authentication failure. If they do match, it calls a registry access application interface to get the trading partner or userid certificate from the registry. It compares the process info and registry certificates. If they do not match, it reports an authentication failure. If they do, it generates an assertion and may signed it. The assertion is returned to the client.

Trust mechanisms may further be used implement different levels of classification for electronic commerce documents. For instance, critical military components may require a special set of top-secret security credentials, whereas commissary goods may be handled using routine assertions. Special routing rules may apply to special assertions. For instance, top-secret documents may be routable only through specially trusted gateways that are authorized to translate top-secret documents. Specially trusted gateways may be subject to additional security measures, such as heightened monitoring, especially strong encryption, dedicated transport media, et cetera.

Figure 15:
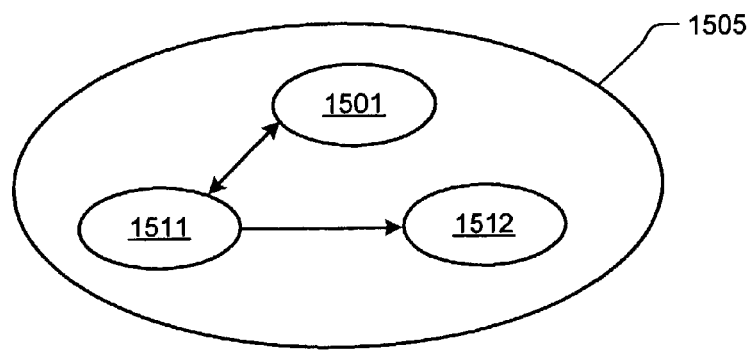
FIG. 15 depicts a security implementation within a community.

Given trust between the source and destination, the mechanics of secure and trusted communication may depend on factors such as whether the source and destination are in the same community, whether they interact directly with the security server or by proxy, and whether both use the same security mechanism. FIG. 15 depicts one security implementation within a community. In this community, all connectors, including source 1511 and destination 1512 trust one another. In this instance, the security server 1501 is a SAML server local to the community. The source 1511 obtains from the SAML server 1501 a security credential for authentication and further may obtain an attributes assertion for authority. At least the security credential and electronic commerce document are packaged in an envelope and sent along a route within the community from the source to destination. This route may contain connectors not shown in the figure.

Figure 16:
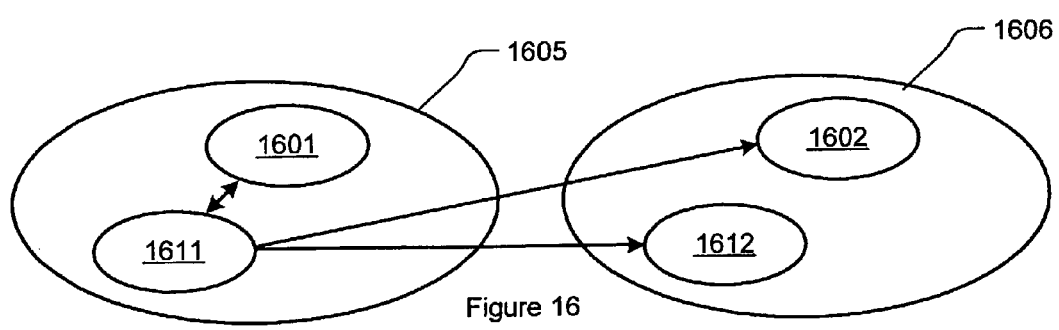
FIG. 16 depicts a security implementation between communities.

FIG. 16 depicts the source 1611 in a first community 1605 and the destination 1612 in a second community 1606. The network concept requires that source and destination have information about other communities with whom they exchange documents. When SAML is used as the security mechanism, this information about other communities includes the identity of SAML servers in the other communities that are trusted to provide security services. The SAML servers in other communities are explicitly listed as being trusted by the local community. In FIG. 15, each of the communities 1605, 1606 includes a SAML service 1601, 1602 and either the source 1611 or destination 1612. When the source is sending a document to the destination, the source request its SAML server 1601 to provide a SAML assertion. The source also queries the destination's SAML server 1602 to retrieve authorization information. Assertions from both the SAML servers are sent along with the electronic commerce document to the destination. As a performance enhancement, the community to which the source belongs or the source's security service can save the SAML assertion retrieved from the second community 1606, or both local and foreign SAML assertions for later reuse, to improve system performance. Alternatively to SAML mechanisms, when a PKI mechanism is used, the certificate in the of the trusted Certification Authority which issued the certificate for the source must be registered in the destination community (1606). For username and password security, valid username and password combinations are registered with destination communities and gateways.

Figure 17:
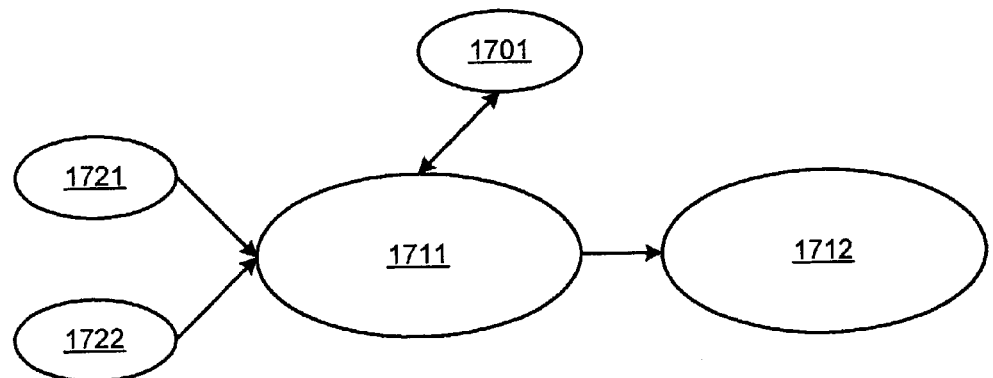
FIG. 17 depicts delegation security services.

FIG. 17 depicts delegation of security services. In this figure, connector 1711 hosts security services and acts as a proxy for sources 1721 and 1722. A source 1721, 1722 may be registered to rely on the proxy 1711 for security services. The proxy 1711 identifies itself and the source on whose behalf it is requesting a security assertion, when it communicates with the SAML service 1701. The SAML server then issues a security assertion to the host on behalf of the source and also may issue an attribute assertion. The host forwards at least the security assertion and electronic commerce document to the destination. The security assertion may be accompanied by an advice statement that discloses the host's involvement in the security process.

Figure 18A:
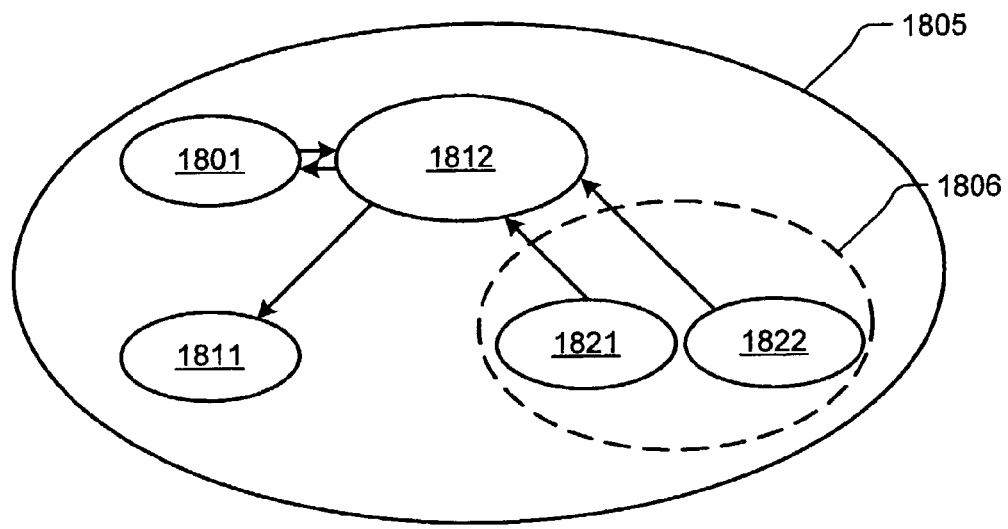
FIGS. 18A and 18B illustrate delegation of authentication to a gateway.
Figure 18B:
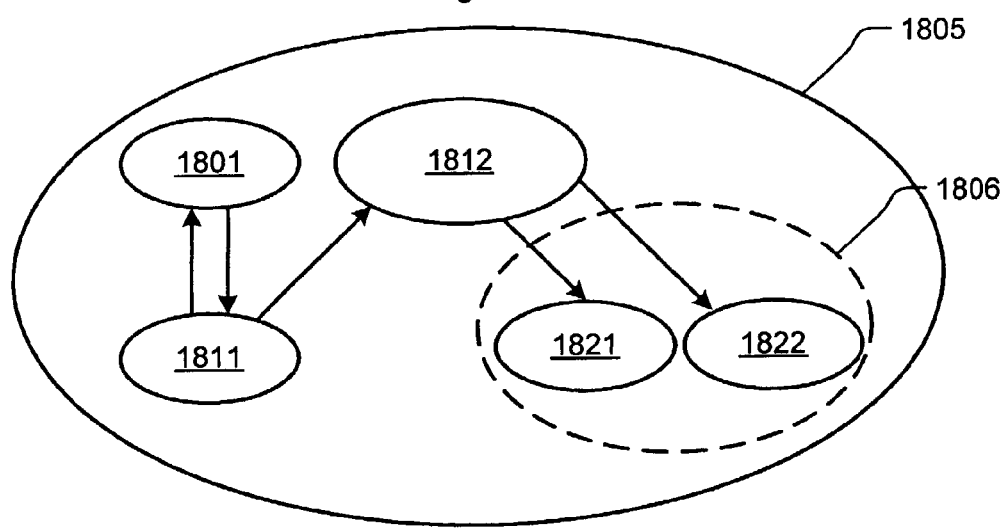

FIGS. 18A and 18B illustrate delegation of authentication to the gateway 1812. In FIG. 18A, connectors 1821, 1822 are in a sub community 1806 of a larger community 1805. These connectors 1821, 1822 utilize an MML protocol to communicate with the gateway 1812. They pass an MPID, userid and password to the gateway. Process info includes the same information. The gateway does a registry lookup to locate the MPID, userid and password it receives. If this triplet is found in the registry, the gateway creates a credential object as an attachment to the MML envelope. The gateway sends a delegation authentication request to the SAML service. The SAML service authenticates using the gateway's credential. The SAML service returns an authentication assertion, which may include an advice section. The authentication assertion is part of what the gateway 1812 forwards to a destination 1811.

In FIG. 18B, communication through the gateway 1812 is reversed. The source 1811 communicates with the connectors 1821, 1822 in the sub community 1806 that uses the MML protocol. The source 1811 obtains a SAML security credential from the SAML server 1801 and forwards this with electronic commerce document to the gateway 1812. The gateway converts a SOAP envelope to an MML envelope. The gateway uses its own MPID, userid and password to create a security credential and attaches it to the MML envelope. The MML envelope is sent to the sub community that uses MML 1806.

Figure 19A:
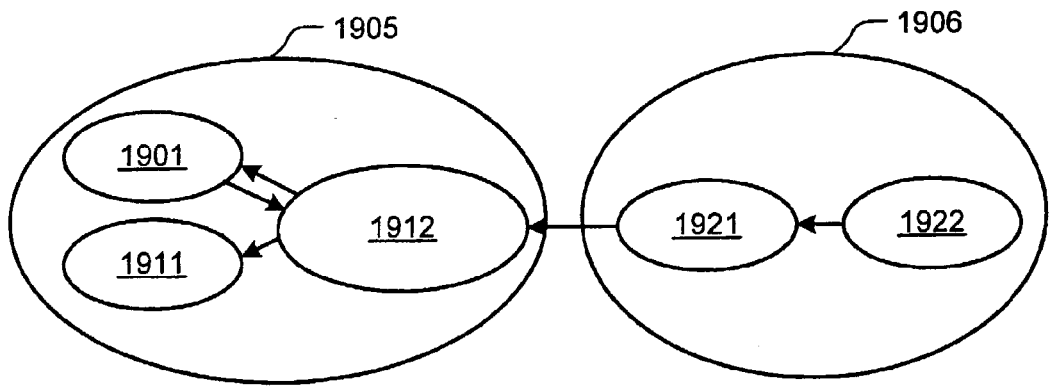
In FIGS. 19A and 19B, translation between MML and SAML security protocols is extended to communication between communities.
Figure 19B:
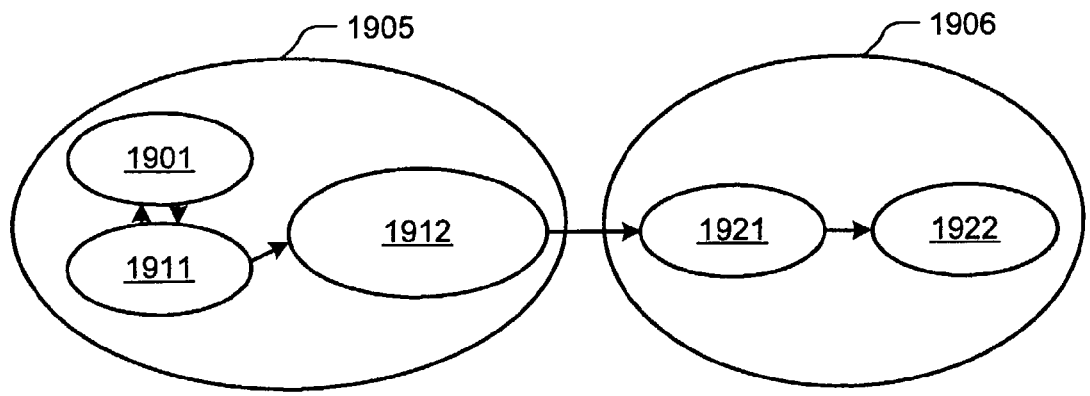

In FIGS. 19A and 19B, translation between MML and SAML security protocols is extended to communication between communities 1905, 1906. The source 1922 is in a community that uses MML and the destination 1911 is in a community that uses SOAP. The source trading partner 1922 relies on a portal router 1921 to forward a security credential and electronic commerce document to the gateway 1912 that handles the envelope and security conversion. The router 1921 passes the security credential to the gateway 1912. The security credential is inside the MML envelope. The gateway extracts the CPID from the security credential in the MML envelope and sends a delegation authentication request to the SAML service. Authentication is done using the gateway's credential. The SAML service returns an authentication assertion, much as described above. The authentication assertion and translated electronic commerce document are forwarded to the destination 1911. In FIG. 19B, communication through the gateway 1912 is reversed. The source 1911 communicates with the destination 1922 in the sub community 1906 that uses the MML protocol. The source 1911 obtains a SAML security credential from the SAML server 1901 and forwards this with an electronic commerce document to the gateway 1912. The gateway converts a SOAP envelope to an MML envelope. The gateway uses its own MPID, userid and password to create a security credential and attaches it to the MML envelope. The MML envelope is sent to the sub community that uses MML 1906.

To facilitate the delegation scenarios illustrated above, the SAML protocol schema may be extended as follows:

```
<?xml version="1.0" encoding="UTF-8"?>
<xsd:schema targetNamespace="http://schemas.commerceone.com/wse/security/delegation"
xmlns:samlp="http://www.oasis-open.org/committees/security/docs/draft-sstc-schema-
protocol-27.xsd" xmlns:ds="http://www.w3.org/2000/09/xmldsig#"
xmlns:xsd="http://www.w3.org/2001/XMLSchema"
xmlns:c1del="http://schemas.commerceone.com/wse/security/delegation"
elementFormDefault="qualified" attributeFormDefault="unqualified" version="0.1">
    <xsd:import namespace="http://www.w3.org/2000/09/xmldsig#"
schemaLocation="xmldsig-core-schema.xsd"/>
    <xsd:import namespace="http://www.oasis-open.org/committees/security/docs/draft-
sstc-schema-protocol-27.xsd" schemaLocation="draft-sstc-schema-protocol-27.xsd"/>
    <!--
        //DelegateFor - the ID of the TP or service for which the delegate is making
the authentication request
        //CommunityID - the community ID where the TP or service is defined
        //CommunityType - the community type (e.g. MOE4x)
        //Description - info only
    -->
    <xsd:complexType name="DelegationType">
        <xsd:complexContent>
            <xsd:extension base="samlp:AuthenticationQueryType">
                <xsd:attribute name="DelegateFor" type="xsd:string"/>
                <xsd:attribute name="CommunityID" type="xsd:string"/>
                <xsd:attribute name="CommunityType" type="xsd:string"/>
                <xsd:attribute name="Description" type="xsd:string"/>
            </xsd:extension>
        </xsd:complexContent>
    </xsd:complexType>
</xsd:schema>
```

A delegation authentication request conforming to the schema may appear as follows:

```
<?xml version="1.0" encoding="UTF-8"?>
<Request xmlns="http://www.oasis-open.org/committees/security/docs/draft-sstc-schema-
protocol-27.xsd" xmlns:ds="http://w3.org/2000/09/xmldsig#"
xmlns:saml="http://www.oasis-open.org/committees/security/docs/draft-sstc-schema-
assertion-27.xsd" xmlns:xsi="http://www.w3.org/2001/XMLSchema-instance"
xmlns:c1del="http//schemas.commerceone.com/wse/security/delegation"
xsi:schemaLocation="http://www.oasis-open.org/committees/security/docs/draft-sstc-schema-
```

-continued

```
protocol-27.xsd
C:\XMLSPY~2.3\draft-sstc-schema-27.xsd"
xsi:schemaLocation="http://schemas.commerceone.com/wse/security/delegation
C:\XMLSPY~2.3\sec-delegation-ext.xsd" RequestID="1fgtTGzMXSqpN++/LcFpBmZWrQg="
MajorVersion="1" MinorVersion="0" IssueInstant="2001-09-11T09:30:47–05:00">
    <RespondWith>AuthenticationStatement</RespondWith>
    <!-- The SAML service will treat the signature block as a blob -->
    <ds:Signature Id="ID01">
        <!-- digital signature -->
    </ds:Signature>
    <AuthenticationQuery xsi:type="c1del:DelegationType" DelegateFor="TPxxx">
        <saml:Subject>
            <saml:NameIdentifier Name="unique-string-that-identifies-the-TP"/>
            <saml:SubjectConfirmation>
                <!-- For basic authentication -->
                <saml:ConfirmationMethod>http//www.oasis-
open.org/committies/security/docs/draft-sstc-core-27/password
                <!-- For X509 certificate based authentication
                <saml:ConfirmationMethod>http://www.oasis-
open.org/committies/security/docs/draft-sstc-core-27/X509
                -->
                </saml:ConfirmationMethod>
            </saml:SubjectConfirmation>
        </saml:Subject>
    </AuthenticationQuery>
</Request>
```

Note that the DelegateFor and the NameIdentifier above refer to the same entity, the party for which the delegation authentication is performed. A sample response to this request, including delegation, may appear as follows:

```
<?xml version="1.0" encoding="UTF-8"?>
<!--Sample XML file generated by XML Spy v4.2 U (http://www.xmlspy.com)-->
<Response xmlns="http://www.oasis-open.org/committees/security/docs/draft-sstc-schema-
protocol-27.xsd" mlns:ds="http://www.w3.org/2000/09/xmidsig#"
xmlns:saml="http://www.oasis-open.org/committees/security/docs/draft-sstc-schema-
assertion-27.xsd" xmlns:xsi="http://www.w3.org/2001/XMLSchema-instance"
xsi:schemaLocation="http://www.oasis-open.org/committees/security/docs/draft-sstc-schema-
protocol-27.xsd
C:\XMLSPY~2.3\draft-sstc-schema-protocol-27.xsd" ResponseID="String"
InResponseTo="1fgtTGzMXSqpN++/LcFpBmZWrQg=" MajorVersion="1" MinorVersion="0"
IssueInstant="2001-09-11T09:30:47–05:00">
    <Status>
        <StatusCode Value="samlp:Success">
            <SubStatusCode Value="q:name"/>
        </StatusCode>
        <StatusMessage>String</StatusMessage>
        <StatusDetail/>
    </Status>
    <saml:Assertion MajorVersion="1" MinorVersion="0"
AssertionID="+1UyxJDBUza+ao+LqMrE98wmhAl=" Issuer="String" IssueInstant="2001-09-
11T09:30:47-05:00">
        <saml:Conditions NotBefore="2001-09-11T09:30:47-05:00"
NotOnOrAfter="2001-09-11T09:30:47-05:00"/>
        <saml:Advice>
            <saml:Subject>
                <saml:NameIdentifier Name="ID-of-the-delegate"/>
            </saml:Subject>
            <saml:AdviceElement xsi:type="xsd:string" value="some
description"/>
        </saml:Advice>
        <saml:AuthenticationStatement>
            <saml:Subject>
                <saml:NameIdentifier Name="unique-string-that-identifies-
the-TP"/>
                <saml:SubjectConfirmation>
                    <!-- For basic authentication -->
                    <saml:ConfirmationMethod>http://www.oasis-
open.org/committees/security/docs/draft-sstc-core-27/password
```

```
                <!-- For X509 certificate based authentication
                <saml:ConfirmationMethod>http://www.oasis-
open.org/committies/security/docs/draft-sstc-core-27/X509
                    -->
                </saml:ConfirmationMethod>
            </saml:SubjectConfirmation>
        </saml:Subject>
    </saml:AuthenticationStatement>
    <ds:Signature Id="ID11">
    </ds:Signature>
    </saml:Assertion>
</Response>
```

When a SAML service creates an assertion by delegation, it uses the <Advice> block above to expose the delegation. Without delegation, the response would be similar, but without the <Advice> block.

In one implementation, the assertion schema does not allow a single request message to contain both authentication and attribute request. In this implementation, the SAML client submits to request: first an authentication request, then and attribute request. The attribute request follows authentication. A sample attribute request follows:

with a service and user management provider 2017, which may be adapted to certificate-based user identification, userid and password based authentication, or another authentication scheme. The service and user management provider 2017 communicates with a module that supports a common object framework (COF) 2018 that, in turn, accesses a registry 2019.

Figure 20:
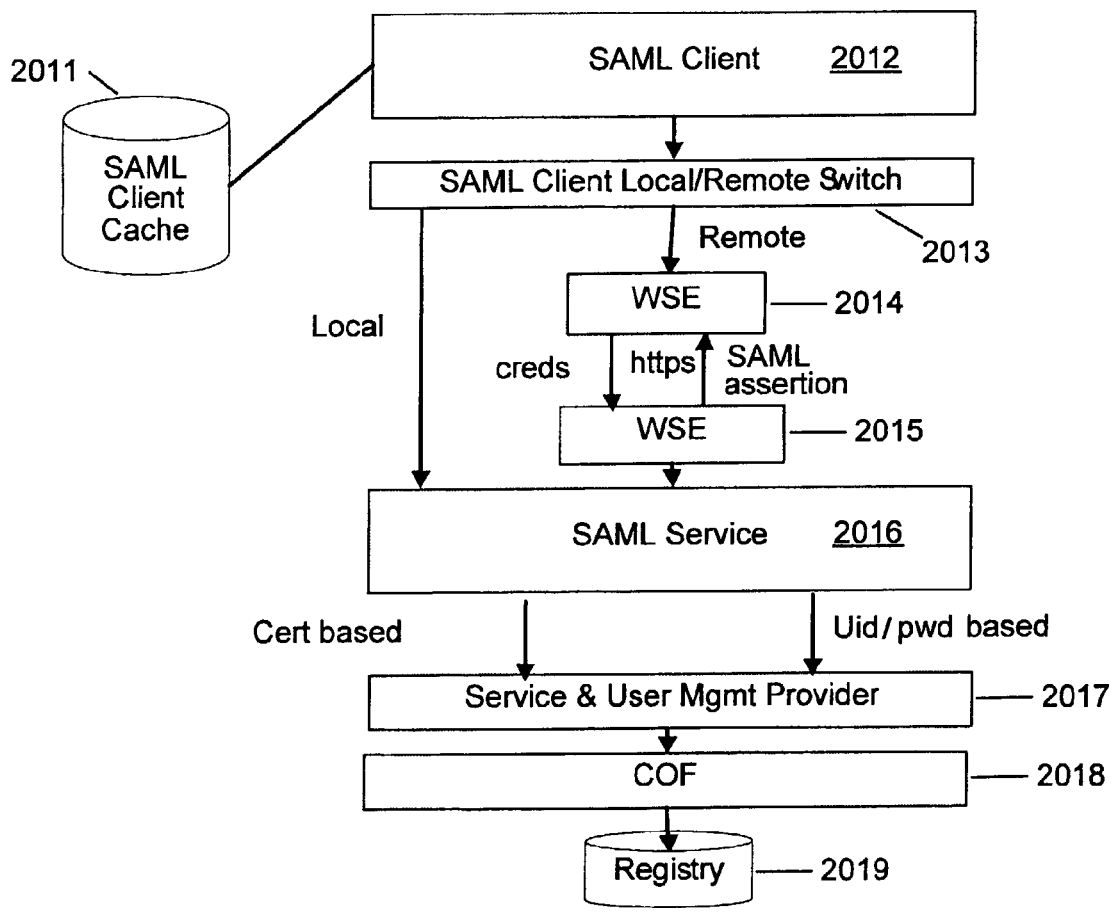
FIG. 20 is a block diagram of a sample client-service design.
Figure 21:
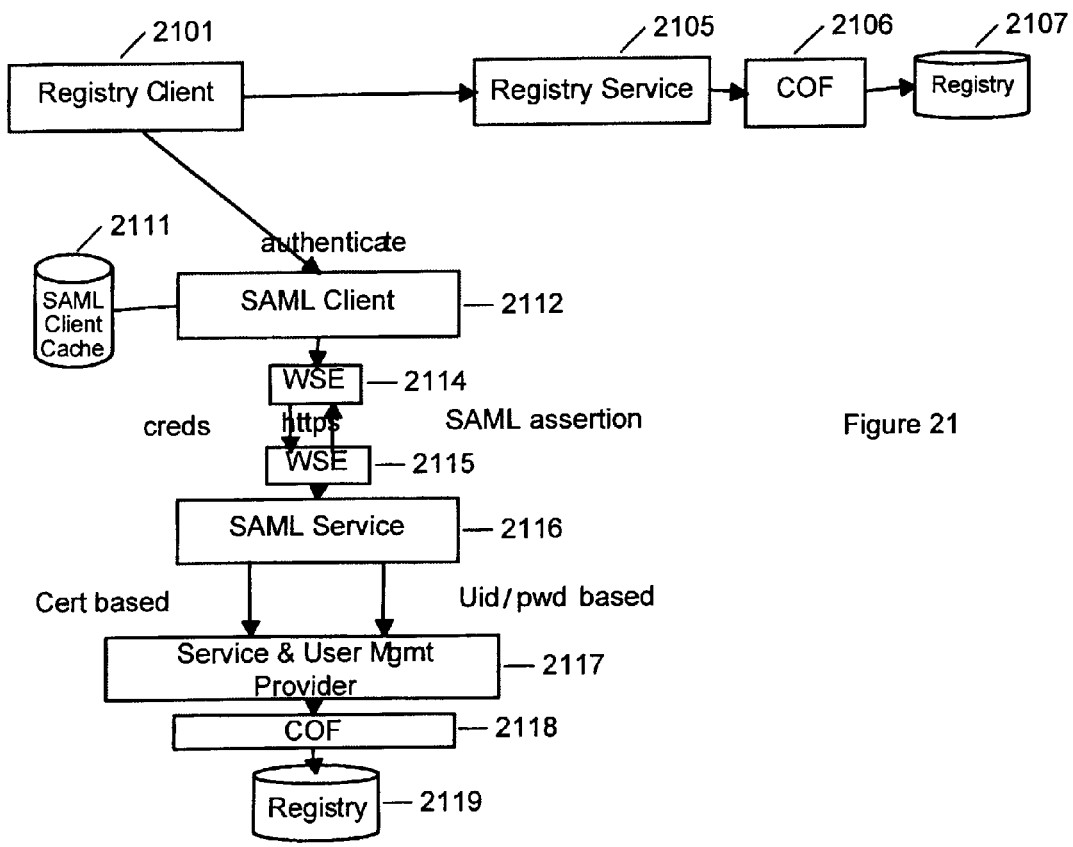
FIG. 21 illustrates registry service local authentication using the design in FIG. 20. A variation on this use case is illustrated in FIG. 22, for registry service remote authentication.

FIG. 21 illustrates registry service local authentication using the design in FIG. 20. The numbering in this figure parallels FIG. 20, except that the registry client 2101,

```
<?xml version="1.0" encoding="UTF-8"?>
<!--Sample XML file generated by XML Spy v4.2 U (http://www.xmlspy.com)-->
<!--Attribute Request -->
<Request xmlns="http://www.oasis-open.org/committees/security/docs/draft-sstc-schema-
protocol-27.xsd" xmlns:ds="http://www.w3.org/2000/09/xmldsig#"
xmlns:saml="http://www.oasis-open.org/committees/security/docs/draft-sstc-schema-
assertion-27.xsd" xmlns:xsi="http://www.w3.org/2001/XMLSchema-instance"
xsi:schemaLocation="http://www.oasis-open.org/committees/security/docs/draft-sstc-schema-
protocol-27.csd
C:\XMLSPY~2.3\draft-sstc-schema-protocol-27.xsd"
RequestID="1fgtTGzMXSqpN++/LcFpBmZWrQg=" MajorVersion="1" MinorVersion="0"
IssueInstant="2001-09-11T09:30:47-05:00">
    <RespondWith>AttributeStatement</RespondWith>
    <AttributeQuery>
        <saml:Subject>
            <saml:NameIdentifier Name="unique-string-that-identifies-this-TP"/>
        </saml:Subject>
        <saml:AttributeDesignator AttributeName="attribute-name-string"
AttributeNamespace="attribute-name-space-string"/>
    </AttributeQuery>
</Request>
```

The attribute assertion response follows from this request.

Figure 22:
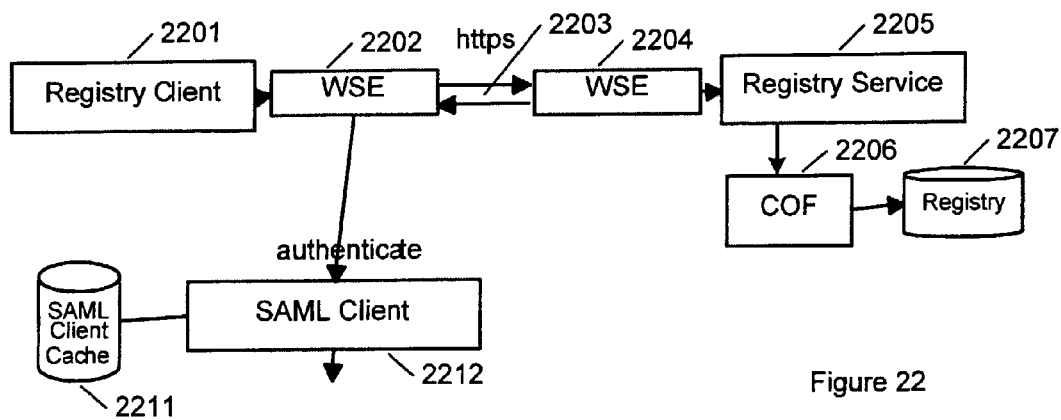

Additional detail of security use cases appears in FIGS. 20 through 25. FIG. 20 is a block diagram of a sample client-service design. In this design, registry service authentication and cost authorization is based on a CP level identity. Registry manager authentication and authorization is based on user level identity. The registry service uses SAML for authentication. It calls for providers application interface directly to determine privileges; it does its own authorization based on the authenticated CP identity. The SAML client 2012 accesses stored SAML client data 2011. The SAML client 2012 communicates with a SAML client switch 2013 that switches between local and remote cases. In the local case, communication is directly with the SAML service 2016. In the remote case, components 2014, 2015 handle communications between the switch and the remote SAML service. Credentials and SAML assertions may be exchanged between the components via HTTPS or another secure protocol. The SAML service 2016 communicates registry service 2105, COF 2106 and the registry 2107 are added. In this use case, the registry client 2101 is initially called. The registry client 2101 calls the SAML client 2112 to obtain authentication. It may use any of the authentication schemes mentioned above. The SAML client may have access to stored SAML client data 2111. It may be able to validate the authentication request from stored data and return a valid assertion. If not, it proceeds with a remote authentication. The SAML client communicates through components 2114, 2115 to the SAML service 2116. The SAML service performs authentication, generate a security credential, may sign it, and returns the security credential to the SAML client 2112. A variation on this use case is illustrated in FIG. 22, for registry service remote authentication. Again, the registry client 2201 is initially called. The registry client determines the remote call needs to be made. It invokes the component 2202 to communicate through a communications channel, such as an https connection 2203, to a counterpart component 2204 and also to communicate with the SAML client 2212. Processing continues as above.

Figure 23:
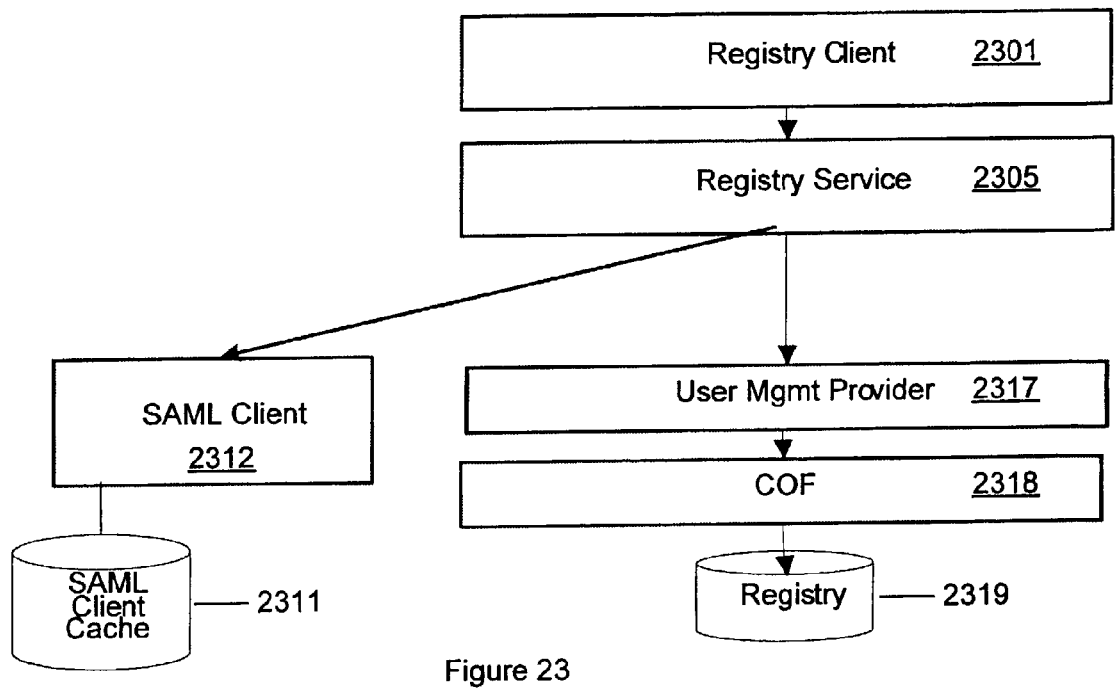
FIGS. 23 and 24 illustrate local and remote authorization.
Figure 24:
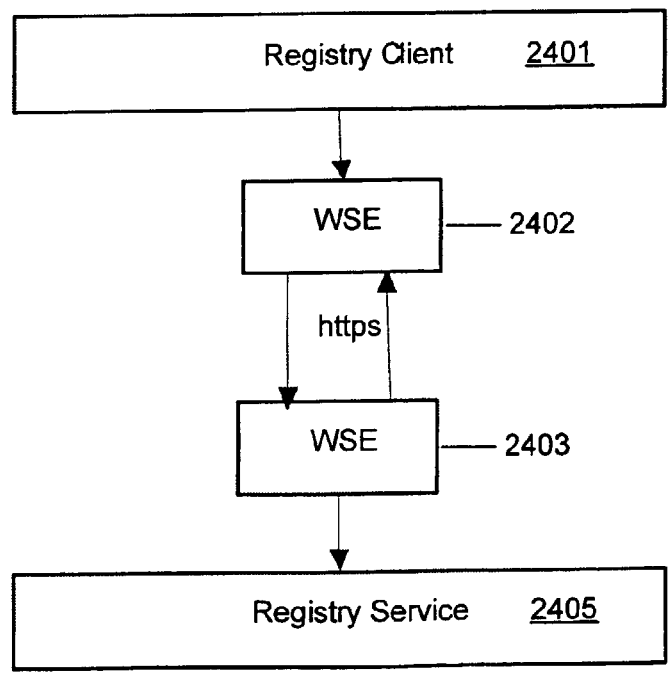

FIGS. 23 and 24 illustrate local and remote authorization, respectively. In FIG. 23, the registry client 2301 calls the registry service 2305 directly, passing and a security credential, for instance, obtained as illustrated in FIG. 21. The registry service calls the SAML client 2312 with the security credential to validate the security credential and get an authenticated CPID. With the authenticated CPID, the registry service 2305 calls the user manager provider numeral 2317 to obtain the privileges for the authenticated CP. Through the COF 2318, the privileges for the CP are obtained from the registry 2319. The registry service numeral 2305 enforces the privileges. In FIG. 24, the local authorization process is extended to remote authorization. As an authentication, the registry client 2401 communicates through components 2402, 2403, in this case reaching the registry service 2405 through the components.

Figure 25:
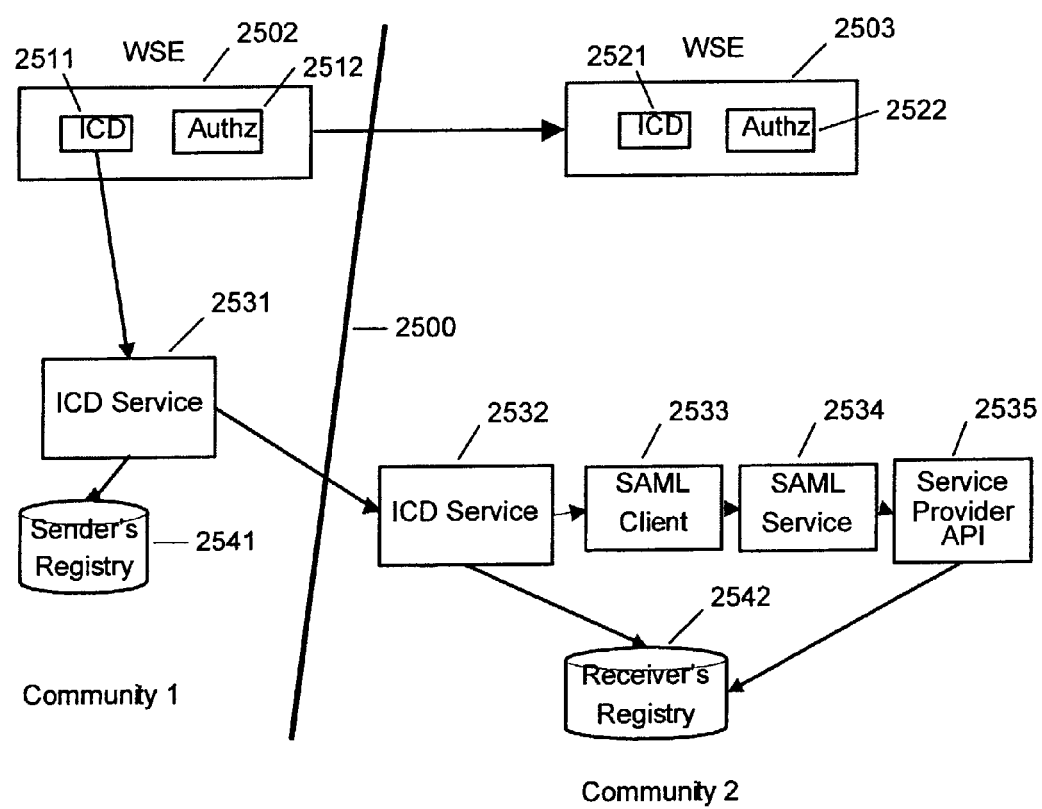
FIG. 25 illustrates obtaining attribute assertions for document service subscriptions.

FIG. 25 illustrates obtaining attribute assertions for document service subscriptions. The components 2502 and 2503 are further detailed as including an ICD client 2511, 2521 and an authorization module 2512, 2522. The ICD client 2511 calls the send side ICD service 2531, which is associated with the send side registry 2541. From the sending side, to the left of the dividing line 2500, the ICD service 2531 calls the receive side ICD service 2532. A security calculator calls a SAML client 2533 to get attribute assertions. The SAML client calls the SAML service 2534 that is local, on the receive side. The SAML service calls a service provider application interface 2535 to obtain information for the sender and creates an attribute assertion. The service provider may access the registry 2542. The attribute assertion is passed back to the send side ICD service 2531 and packaged into the ICD security block 2511. An authorization module 2512 puts the attribute assertion into an envelope header, such as a SOAP envelope header. The envelope is transmitted to component 2503, wherein authorization module 2522 on the receive side reads the attribute assertion and enforces the subscription.

Figure 26:
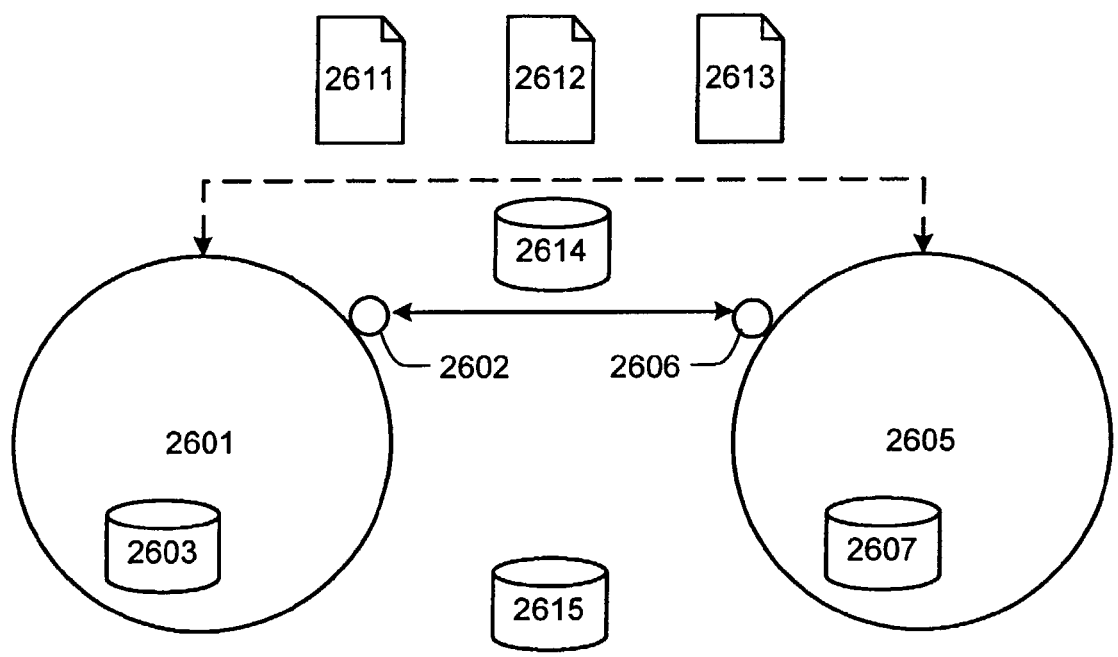
FIGS. 26 and 27 depict establishment of community networks.
Figure 27:
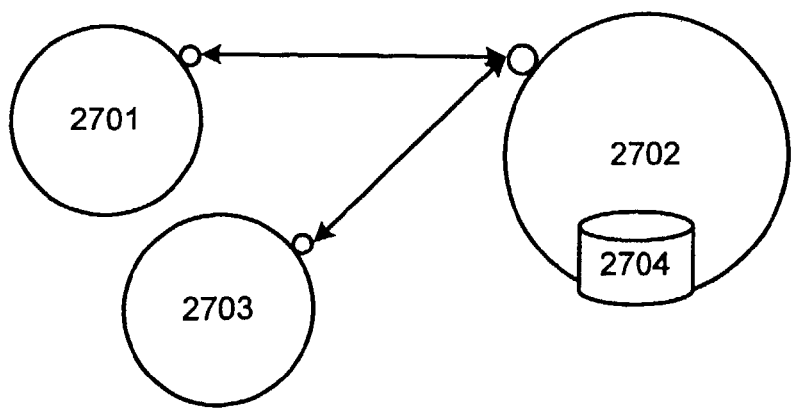

FIGS. 26 and 27 depict establishment of community networks. In FIG. 26, two communities 2601, 2605 participate in the community network. Operators of the communities set up their communities, including external ports 2602, 2606 and local registries 2603, 2607. The local registries identify the external ports. Operators of the communities make an operating arrangement 2611, which may be a traditional contract or an electronic contract. The operating arrangement provides for the communities to form or join a network. The community will have one or more services that are exposed to others in the network. Discovery services and push services permit communities in a network to use services in other communities without duplicate registrations. Operators of the communities further establish a network search registry, sometimes referred to as a global yellow pages directory 2614. Once the network is operating, the communities may push service information from their local registries to the global yellow pages, or the global yellow pages may pull the information from participating communities. The global yellow pages may poll participating communities or wait for notification from the communities that information is available to be pulled. Community operators may mark particular services as visible in the local community, visible in a particular network, visible in all networks or visible to particular other communities. The listing of service information in global yellow pages should correspond to the marking services from visibility. These global yellow pages may be implemented as an UDDI-based registry. It may be external to the communities or hosted by one of the communities in the network. There may be one or more global yellow pages in a network of communities. Operators of the communities exchange information about each other's external port details and URLs 2612. This information enables communication between the external ports 2602, 2606. Operators of the communities also exchange security related information, such as security credentials or SAML certificates 2613. With the exchanged information in hand, the operators of the respective communities load their registries with information necessary to connect to the external community. For instance, they may register the external community's external ports and security information. They further may register their own external ports corresponding to the external communities ports. Operators of the communities further establish a global search registry, sometimes referred to as white pages 2615. It may be external to the communities or hosted by one of the communities in the network. When the global search registry is hosted by one of the communities, it serves as a community address server. Individual communities to become part of the network of communities in which the community address server functions can join the network by exchanging set up information 2611, 2612, 2613 with the community address server and obtain from the community address server the set up for other external communities, such as ports, security credentials, etc. by registering in their local registry the ports for the community address server, instead of specifically setting up registry entries for each and every community in the network. Interoperability may be established through the community address server, following rules and practice in the community network, and potentially subject to bilateral agreements 2611 among communities doing business with each other.

FIG. 27 depicts a network of more than two communities, in which one community hosts the community address server. Community 2702 holds the community address server 2704. Communities 2701 and 2703 exchange information with the host community and become able to discover services that each of them offer and, protocols allowing, to communicate with each other. Their communications may be direct, mediated by an intermediate community, or obligated to pass through an intermediate community, accordance with rules of the network. In a network of more than two communities, direct private links may be established between participating communities and recorded in the respective community registries, or the community address server may be used to establish connections and trust. A less likely use case is a network of more than two communities established without a community address server, where all of the members register one another on a point-to-point basis. This use case does not benefit from streamlined addition of new members to the network.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for computer-assisted processing, systems including logic to implement the methods, media impressed with logic to carry out the methods, data streams impressed with logic to carry out the methods, or computer-accessible processing services. It is contemplated that modifications and combinations will readily occur to those skilled in the art, which modifications and combinations will be within the spirit of the invention and the scope of the following claims.

We claim as follows:

1. A method of computing a route to send an electronic commerce document from a source to a destination in different communities, including:
   mapping the source and destination to connectors within respective communities;
   identifying one or more shared community networks in which the respective communities are registered and linking between similar external ports of the respective communities when the similar external ports use the same transport/envelope protocol;
   computing intra-community routes within the respective communities from the source and destination connectors to respective external ports; and
   specifying a route of intra-community connectors and external ports spanning from the source to the destination.

2. The method of claim 1, wherein identifying further includes:
   accessing a local registry to determine if a direct route is known from the source community to the destination community; and, if not,
   accessing one or more global registries for one or more community networks available to the source community and determining if a route is known through the community network from the source community to the destination community.

3. The method of claim 1, wherein identifying alternatively includes identifying one or more entities available to the respective communities that provide translation services and linking from the respective external ports through the translation entities.

4. The method of claim 1, wherein identifying alternatively includes identifying one or more intermediary communities that belong to community networks available the respective source and destination communities and linking from external ports of the respective source and destination communities through the intermediary communities.

5. The method of claim 4, wherein the intermediary communities further provide translation services from a source transport/envelope protocol to a destination transport/envelope protocol.

* * * * *